United States Patent [19]
Raymond

[11] 3,976,098
[45] Aug. 24, 1976

[54] HYDRAULIC MOTOR CONTROL APPARATUS

[75] Inventor: Robert E. Raymond, Zanesville, Ohio

[73] Assignee: International Basic Economy Corporation, New York, N.Y.

[22] Filed: Jan. 2, 1974

[21] Appl. No.: 430,047

[52] U.S. Cl. ................................ 137/608; 137/271; 137/596.14; 91/461; 137/596.13
[51] Int. Cl.² ........................................ F16K 11/10
[58] Field of Search ...... 137/608, 269, 271, 596.14, 137/596.15, 596.16, 596.13; 91/461

[56] References Cited

UNITED STATES PATENTS

| | | | |
|---|---|---|---|
| 2,650,609 | 9/1953 | Herbst | 137/596.14 |
| 3,170,484 | 2/1965 | Benz et al. | 137/596.16 |
| 3,215,158 | 11/1965 | Bass, Jr. et al. | 137/269 |
| 3,216,443 | 11/1965 | Schmiel | 137/269 |
| 3,504,704 | 4/1970 | Beckett et al. | 137/269 |
| 3,513,876 | 5/1970 | Tarbox | 137/269 |
| 3,516,442 | 6/1970 | Munroe | 137/269 |
| 3,589,387 | 6/1971 | Raymond | 137/608 |
| 3,601,235 | 8/1971 | Huf | 91/461 |
| 3,641,877 | 2/1972 | Hebert | 91/461 |
| 3,774,635 | 11/1973 | Farrell et al. | 137/608 |
| 3,815,477 | 6/1974 | Ailshie et al. | 137/596.13 |

*Primary Examiner*—William R. Cline
*Assistant Examiner*—H. Jay Spiegel
*Attorney, Agent, or Firm*—Palmer Fultz

[57] ABSTRACT

A hydraulic motor control apparatus comprising a plurality of standard multiple function modules adapted to be selectively programmed in various arrays to effect substantially any required hydraulic control function.

25 Claims, 44 Drawing Figures

HYDRAULIC MOTOR CONTROL APPARATUS

BACKGROUND OF THE INVENTION

This invention relates generally to hydraulic apparatus and more particularly to fluid motor control systems adapted to be fabricated from a plurality of multiple-function standardized components.

PRIOR ART PRACTICE

In the fabrication of hydraulic control systems, such as power packages for the industrial field as well as for pump, motor, and control valve assemblies for mobile equipment, military applications, and other uses where controlled fluid power systems are required, it has been the practice in the art to fabricate the control systems from various control valves and associated components that are connected in circuit by external piping.

In other instances, it is a practice in the art to join together such valves and components in contiguous relationship so as to eliminate some external piping by bolting together housings of individual components such that the ports in one housing connect directly with the ports of the next adjacent housings of the system. This approach has resulted in the elimination of certain external piping but the applications have been specialized and have consisted of custom-built housings and bases constructed for the particular application without any provision for standardization and interchangeability of multiple-function modular components. Such conventional hydraulic control systems which inherently require a plurality of individual control valves for performing different control functions have traditionally associated together various valves of both standard and specially designed construction, with the result that each of the individual control valves has been incorporated in the overall control system as a separate species constructed of its own respective specialized valve components.

SUMMARY OF THE INVENTION

In accordance with the present invention, a unique system is provided for fabricating substantially any fluid power control system to perform substantially any control function, both simple and sophisticated, from a plurality of multiple-function standardized circuit-forming block components of modules without the use of major interconnecting piping conduits.

As another aspect of the present invention, the circuit-forming modules are all uniquely arranged to include what will be termed herein a "four duct" configuration which can be arranged and programmed, with standardization to selectively provide an infinite number of motor control applications.

As another aspect of the present invention, the novel system incorporates multiple-function basic control valve modules of standardized construction, including a multiple-function spool valve element, which can be applied to the above-mentioned system in a variety of selectively programmed modulating and switching configurations so as to provide a variety of control functions, as well as a variety of structural arrays such that virtually any simple or complex hydraulic control application can be achieved from standardized multiple-function modules.

As another object of the present invention, the above-mentioned standardized multiple-function circuit-forming modules are adapted to cooperate in a unique way with the above-mentioned multiple-function valving module so as to permit the fabrication of substantially any composite hydraulic control system from a relatively small inventory of standardized multiple-purpose blocks or modules of simple, inexpensive design.

As another aspect of the present invention, the standardized components includes the unique combination of a standardized signal flow center block module adapted to register and cooperate with a plurality of side arm assemblies of standardized signal flow switching modules in an infinite variety of arrays. It will be understood that with this arrangement, various different control and circuit-forming functions can be respectively provided by the outwardly extending side arm assemblies with the switching of flow between the side arm assemblies being affected by the above-mentioned center block and associated valve module so as to accomplish any selected interbranch valving function. Moreover, and most important, any or all of the above-mentioned side arm assemblies can in turn be arranged to communicate with additional center blocks and thereby deliver a switched or controlled flow to a next successive valving module on the additional center block so as to vary, amplify or refine the flow. It will now be understood that various control flows can be divided, combined, modulated, amplified and treated in various ways merely by the use of the standardized circuit-forming modules and valve modules defined above.

As still another aspect of the present invention, a novel standardized multiple function power flow module is provided which includes selectively programmable dual power flow spool elements for controlling the relatively high volume power flows between the pump and fluid motor of the various motor control systems. Such power flow module includes standardized interfaces and porting that register with interfaces and porting of the above-mentioned signal flow modules such that the latter can be mounted directly thereon and deliver control flows of relatively low volume between any selected arrays of the signal flow modules and the above-mentioned programmable power flow spool elements. Moreover, this unique arrangement permits the selective programming of four-way, three-way, or two-way directional motor control operation, as well as any desired switching and modulating functions of the signal flow so as to effect virtually any desired simple or sophisticated controlled actuation of a motor control system.

As still another aspect of the present invention, all of the above-mentioned power flow and signal flow modules, as well as spacer block modules adapted for use therewith, are structurally standardized to the extent that their ultimate assembly into an array of controlled branches can be accurately, schematically depicted on a two-dimensional schematic drawing or flow strip such that even the more complex flow paths as well as the valving functions performed thereon can be easily designed and readily understood. This permits a hydraulic technician with ordinary skill to readily program a selected control system on a two dimension flow diagram in a manner that he can readily select the necessary standard modules required for the particular application. It should be emphasized that it is only by the overall standardization of all of the various components described above, that such simplification of a complex multiple control apparatus to a two-dimensional flow strip can be realized.

Further objects and advantages of the present invention will be apparent from the following description, reference being had to the accompanying drawings wherein a preferred form of embodiment of the invention is clearly shown.

AN EXAMPLE OF A SIMPLE FLUID MOTOR CONTROLLER

Reference is next made to FIGS. 5 through 8 which illustrate a simplified version of a motor controller the operation of which will be described in detail later herein in the description of the circuitry of FIGS. 1 and 2.

Figure 1:
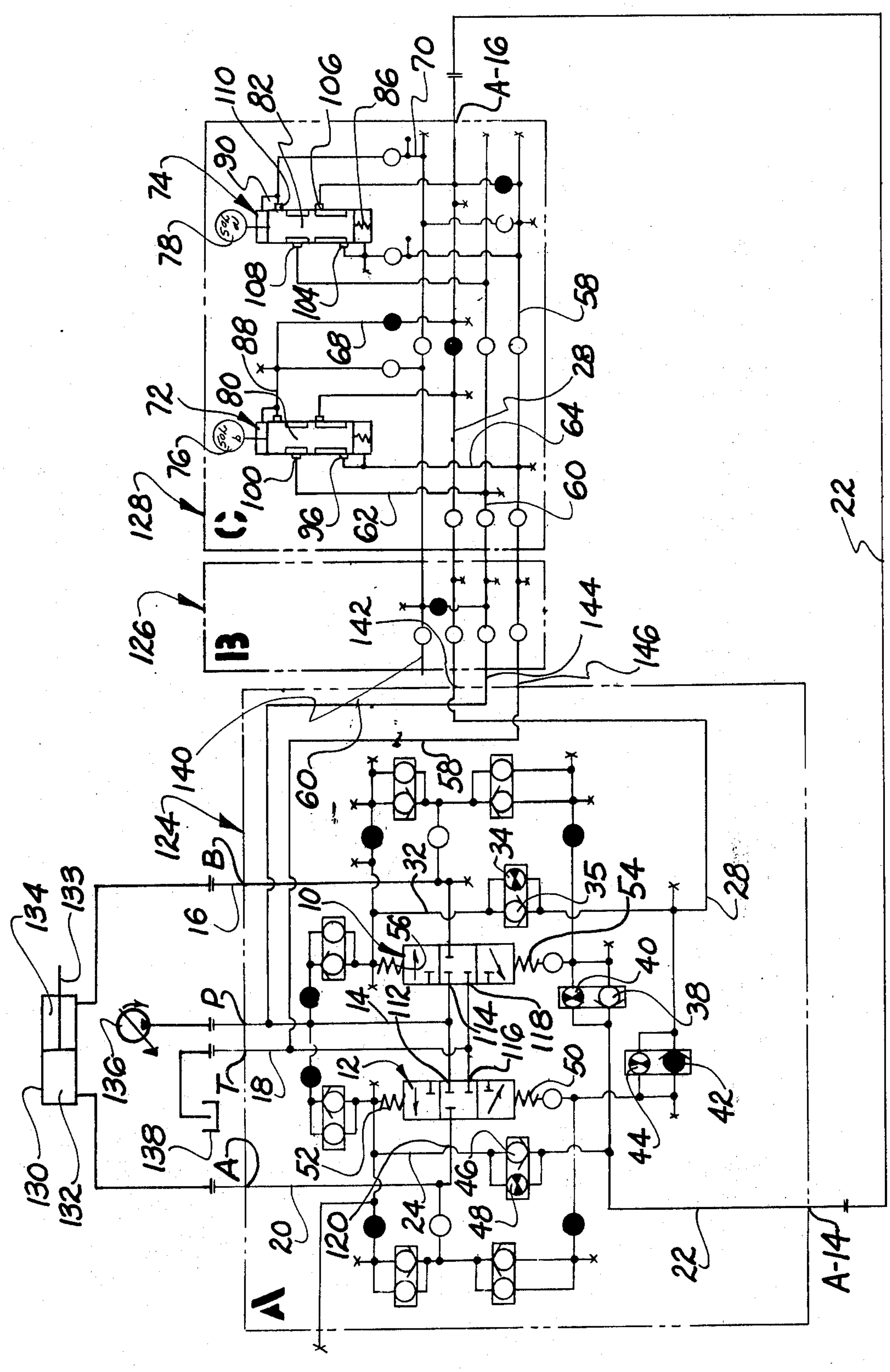
FIG. 1 is a diagrammatic view of a simple motor controller constructed in accordance with the present invention which shows all of the standardized passages and porting.
Figure 2:
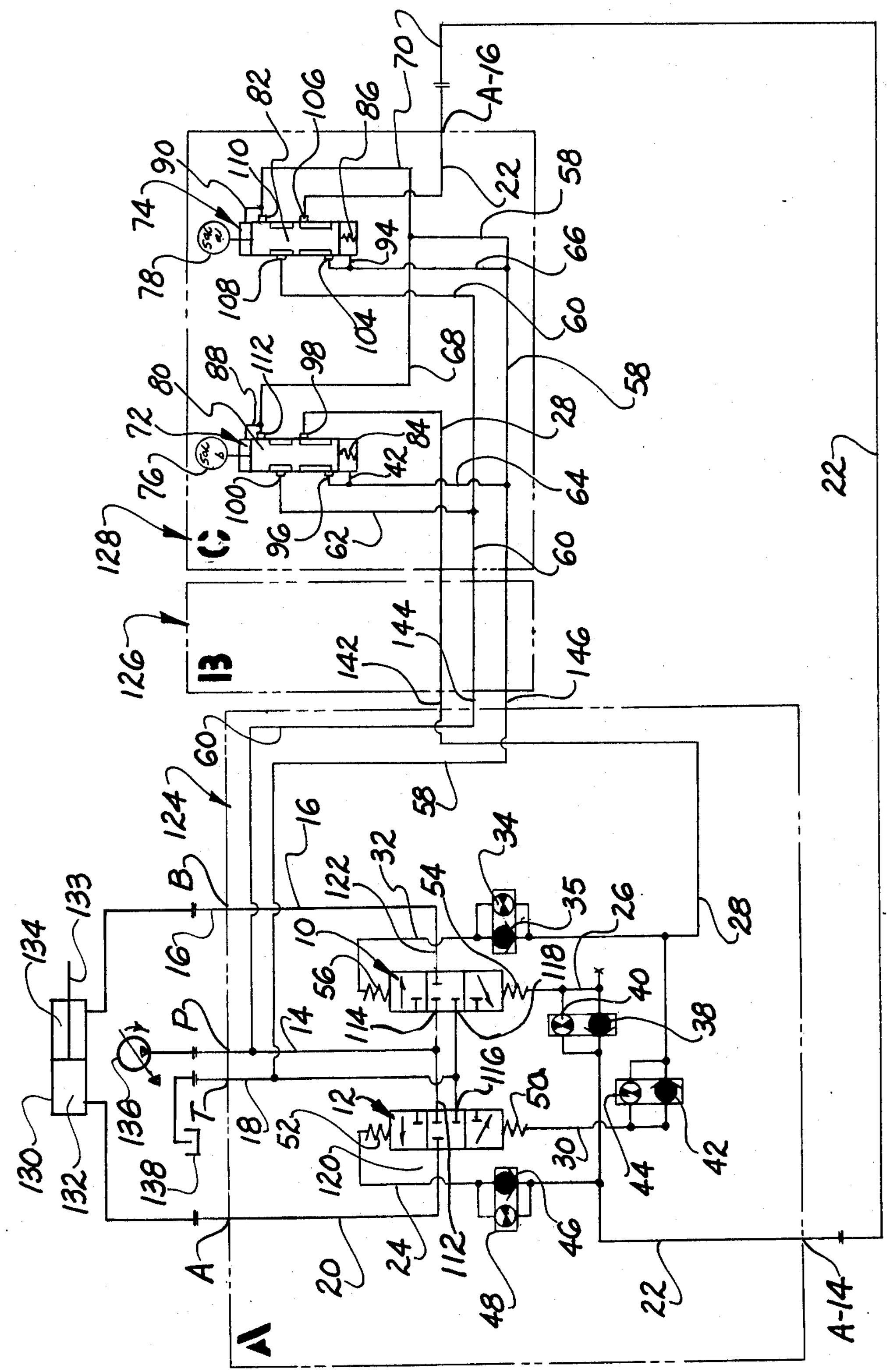
FIG. 2 is a simplified diagrammatic view of the motor controller of FIG. 1 with certain unused passages and ports having been eliminated for the purposes of clarity in describing the operation of the system.
Figure 3:
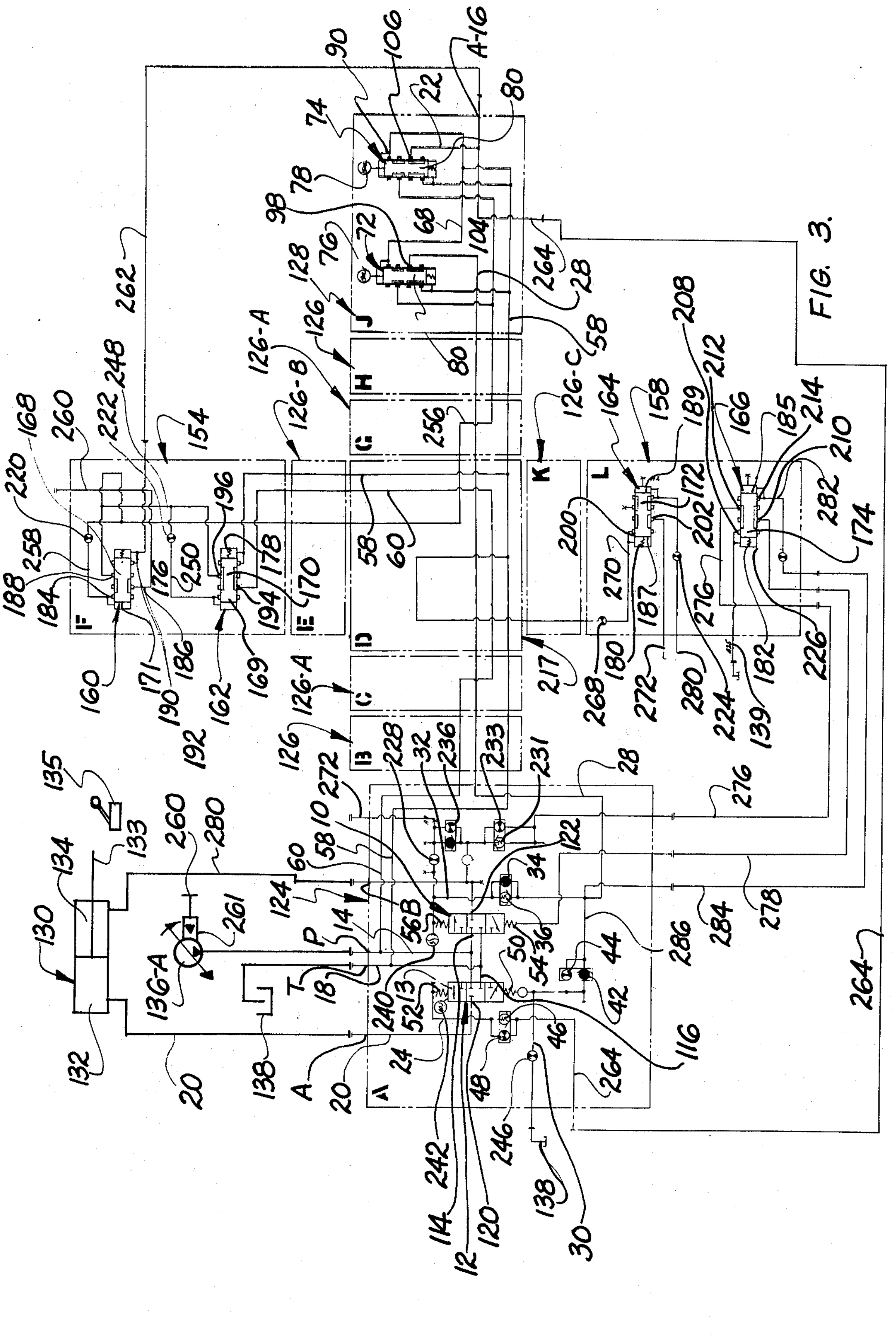
FIG. 3 is a simplified didagrammatic view of the motor controller of FIG. 4 with certain unused passages and ports having been eliminated for the purposes of clarity in describing the operation of the system.
Figure 4:
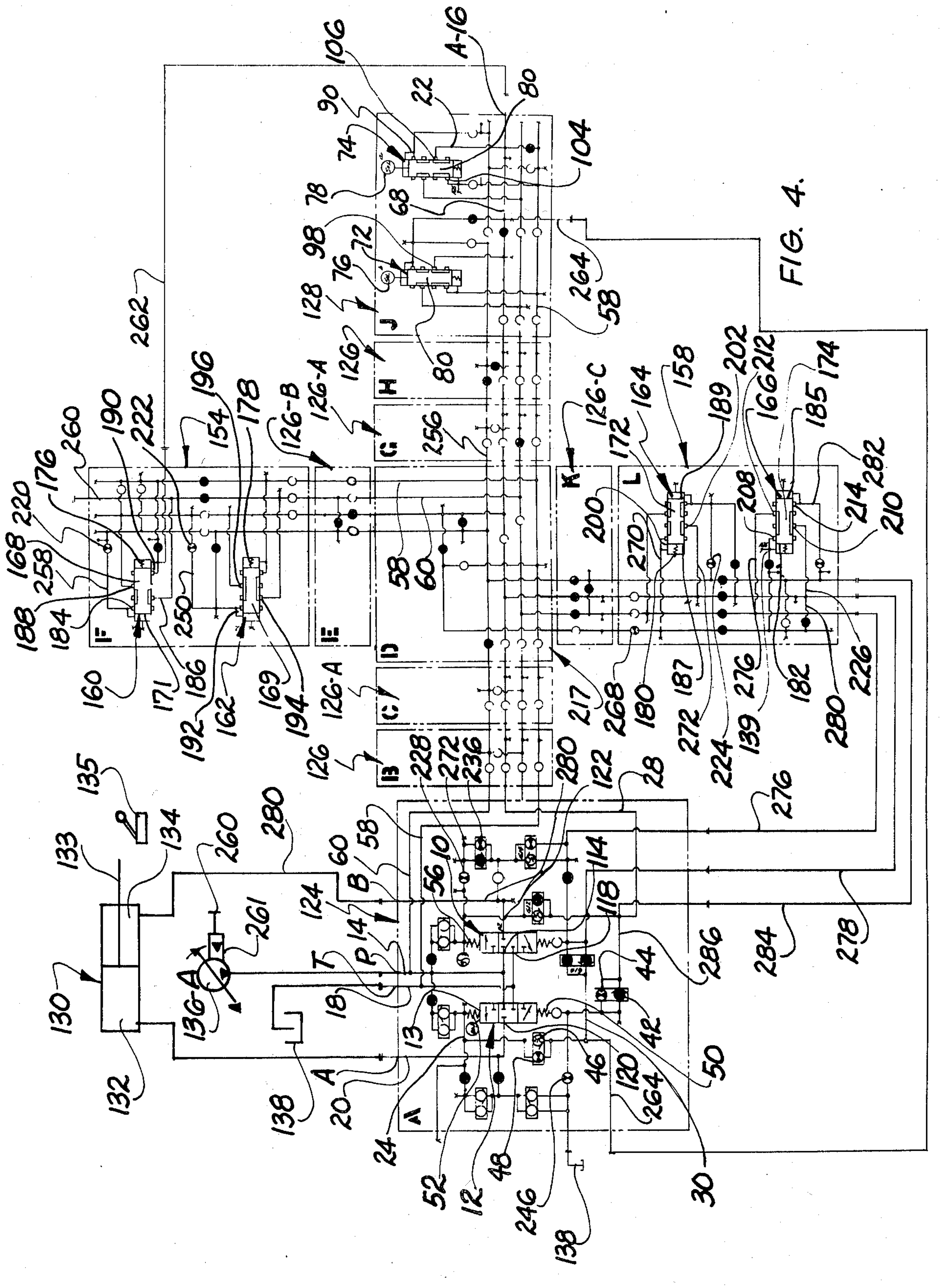
FIG. 4 is a diagrammatic view of a more complex motor controller constructed in accordance with the present invention which shows all of the standardized passages and porting.
Figure 6:
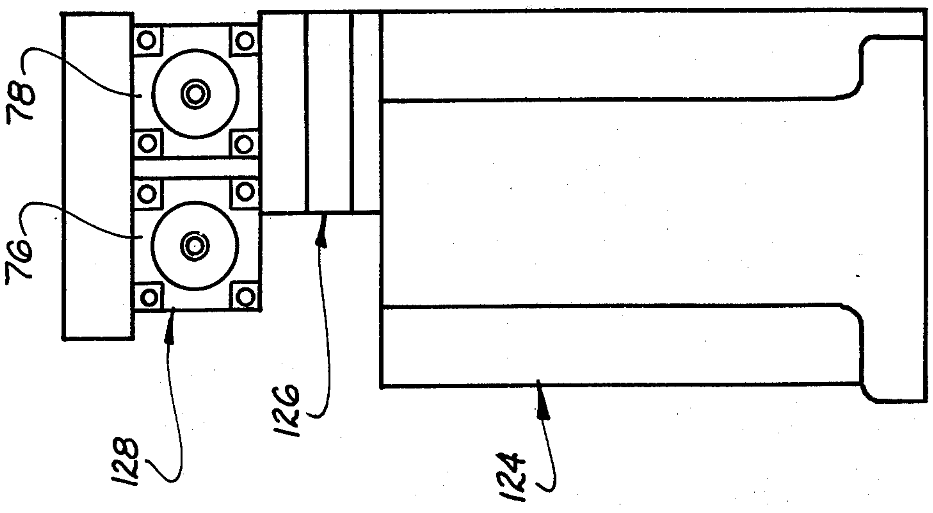
FIG. 6 is a left elevational view of the motor controller of FIGS. 1 and 2.
Figure 5:
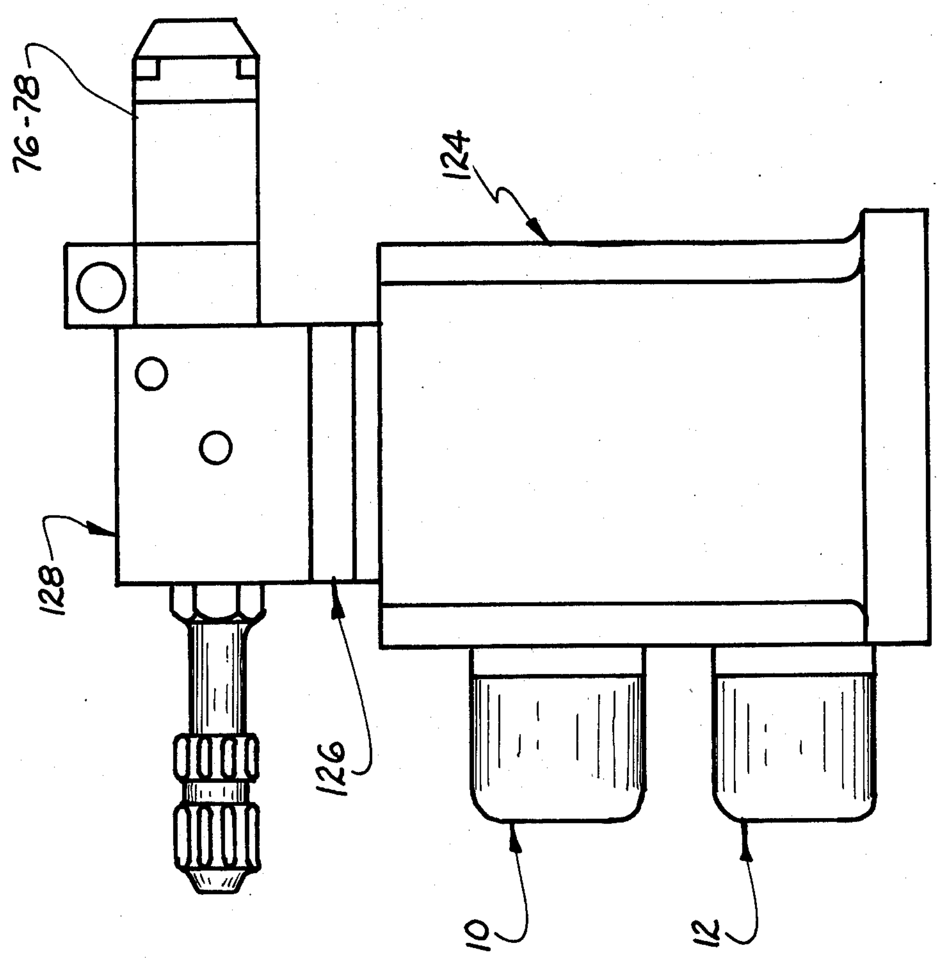
FIG. 5 is a front elevational view of the simple motor controller of FIGS. 1 and 2.
Figure 8:
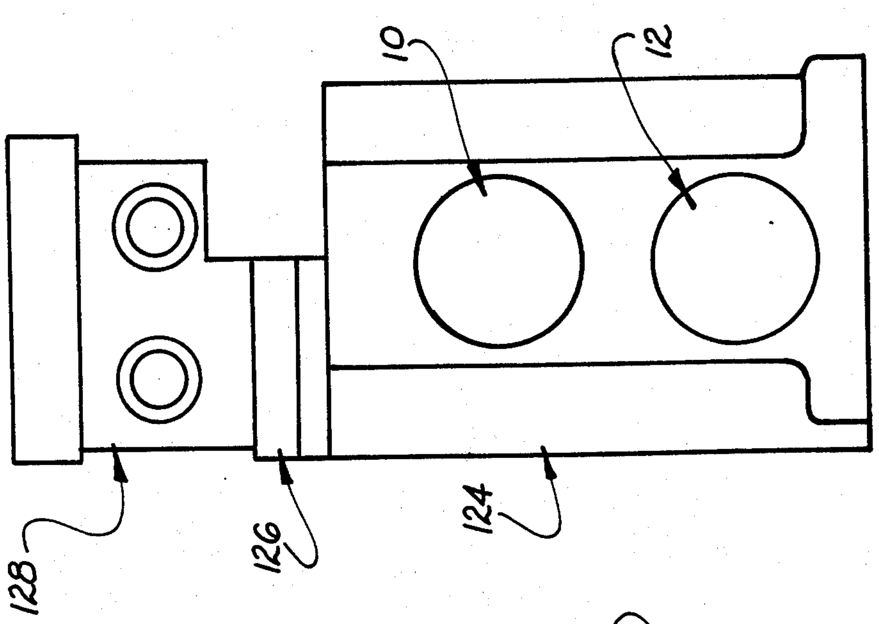
FIG. 8 is a right elevational view of the motor controller of FIGS. 1 and 2.
Figure 7:
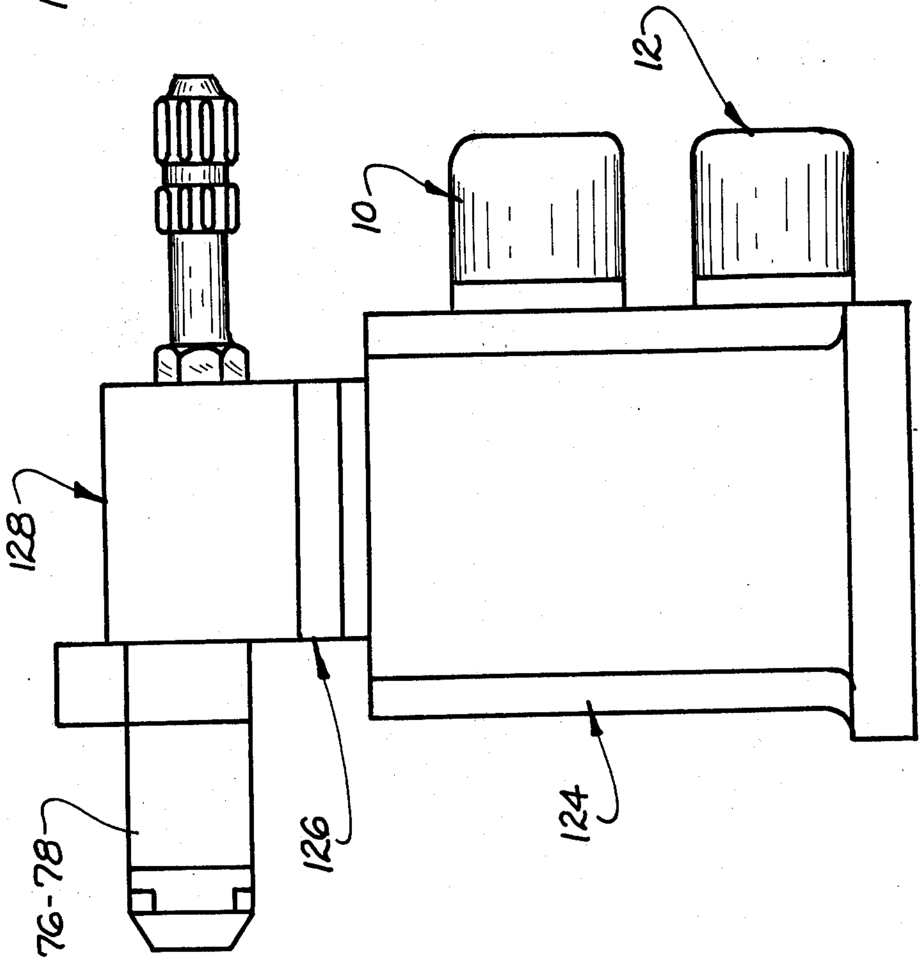
FIG. 7 is a rear elevational view of the motor controller of FIGS. 1 and 2.
Figure 10:
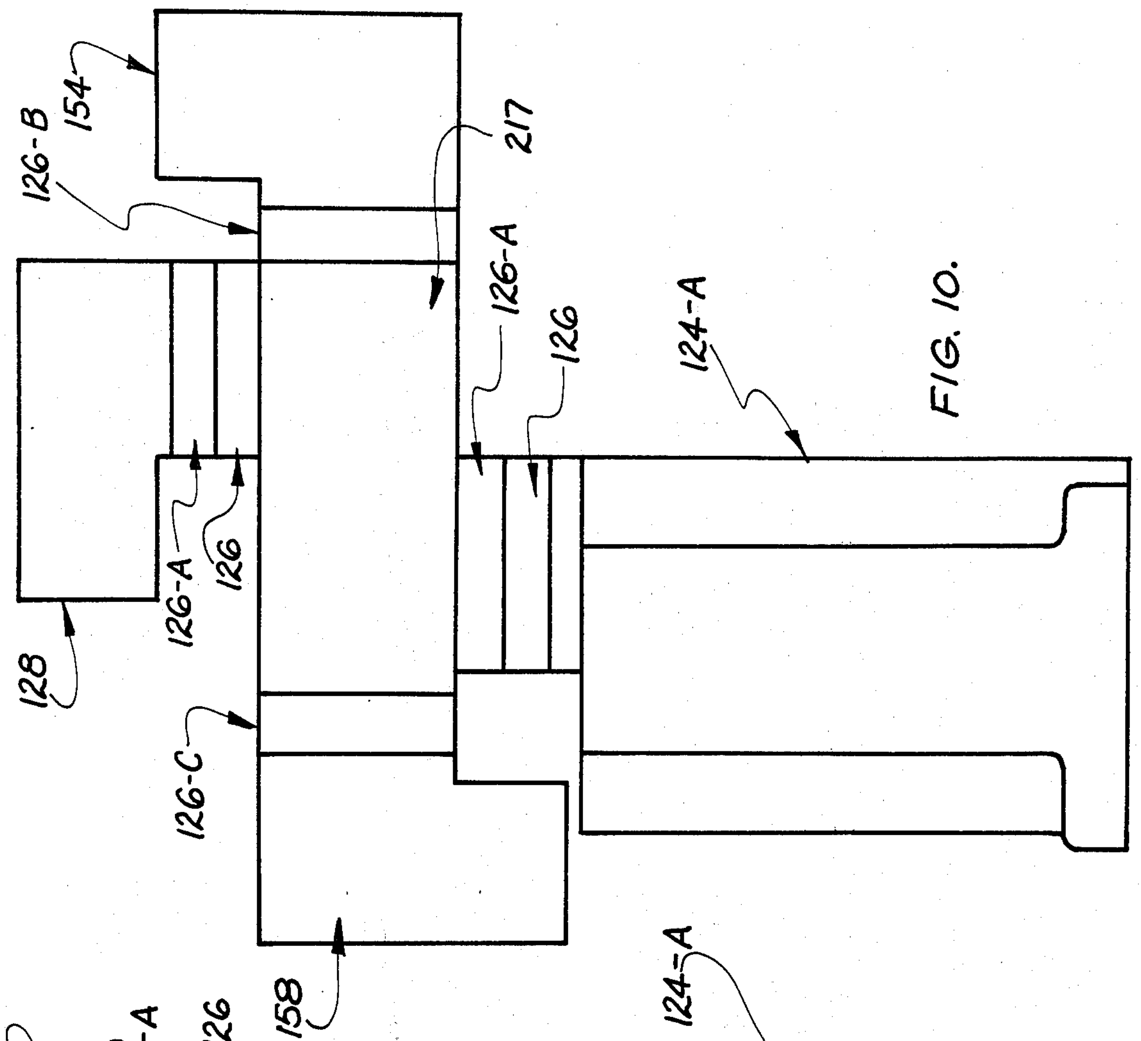
FIG. 10 is a left elevational view of the motor controller of FIG. 3 and FIG. 4.
Figure 9:
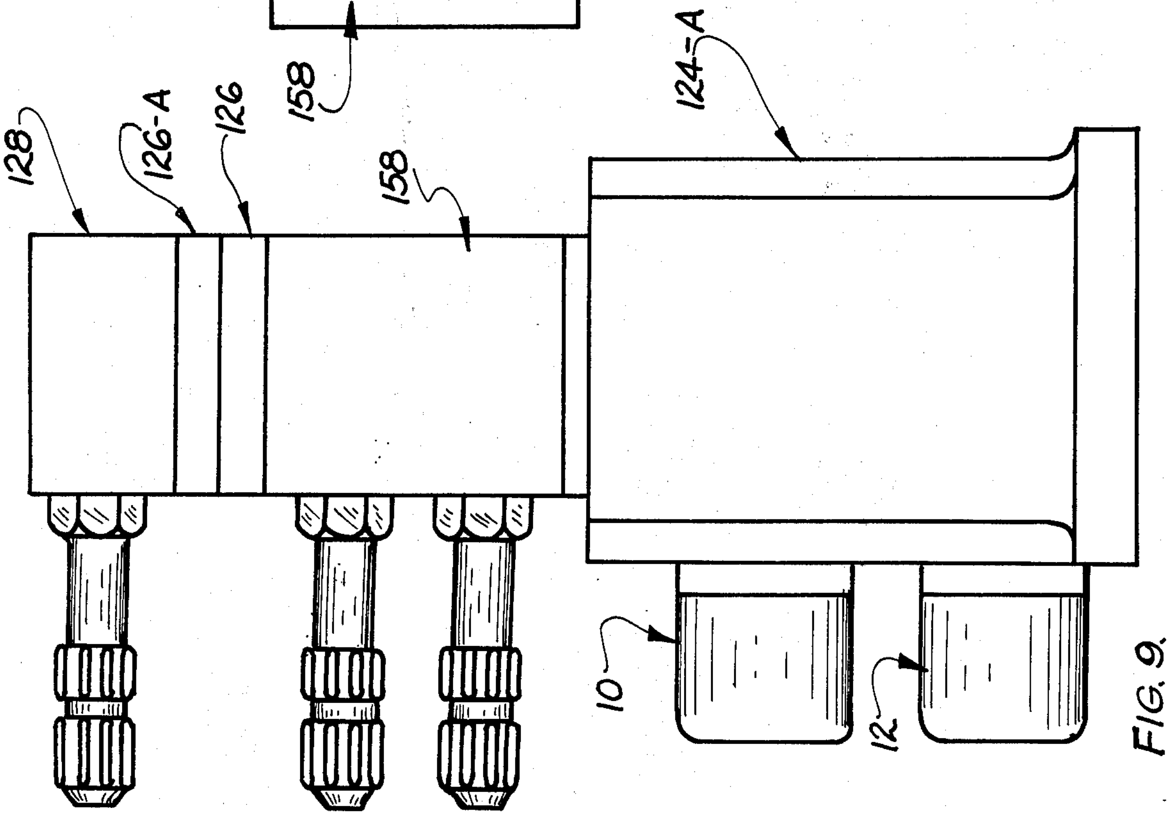
FIG. 9 is a front elevational view of the more complex motor controller of FIGS. 3 and 4.

The power flow control to motor 130 is controlled directly by a power flow module 124 also indicated herein as module A which is connected to a signal flow signal switching module indicated generally at 128 and also designated in the drawings as module C in the simplified system of FIGS. 1 and 2 and also as module J in the more complex system of FIGS. 3 and 4.

Referring again to FIGS. 5–8, the basic power flow module 124 which controls the power flow to fluid motor 130 includes a standard interface and standardized porting which are adapted to be mounted to and register with a spacer block indicated generally at 126 and also designated as B which spacer block in turn is provided with standardized porting which registers with the previously mentioned signal flow switching module 128.

In general, it should be mentioned that the simplified motor controller of FIGS. 5–8 includes the power flow elements 10 and 12 which serve to control the power flow to and from the fluid motor and also the signal flow elements 72 and 74 which monitor the signal flow to power flow elements 10 and 12 and which are in this particular example actuated by solenoids 76 and 78.

AN EXAMPLE OF A MORE ADVANCED FLUID MOTOR CONTROLLER

Figure 12:
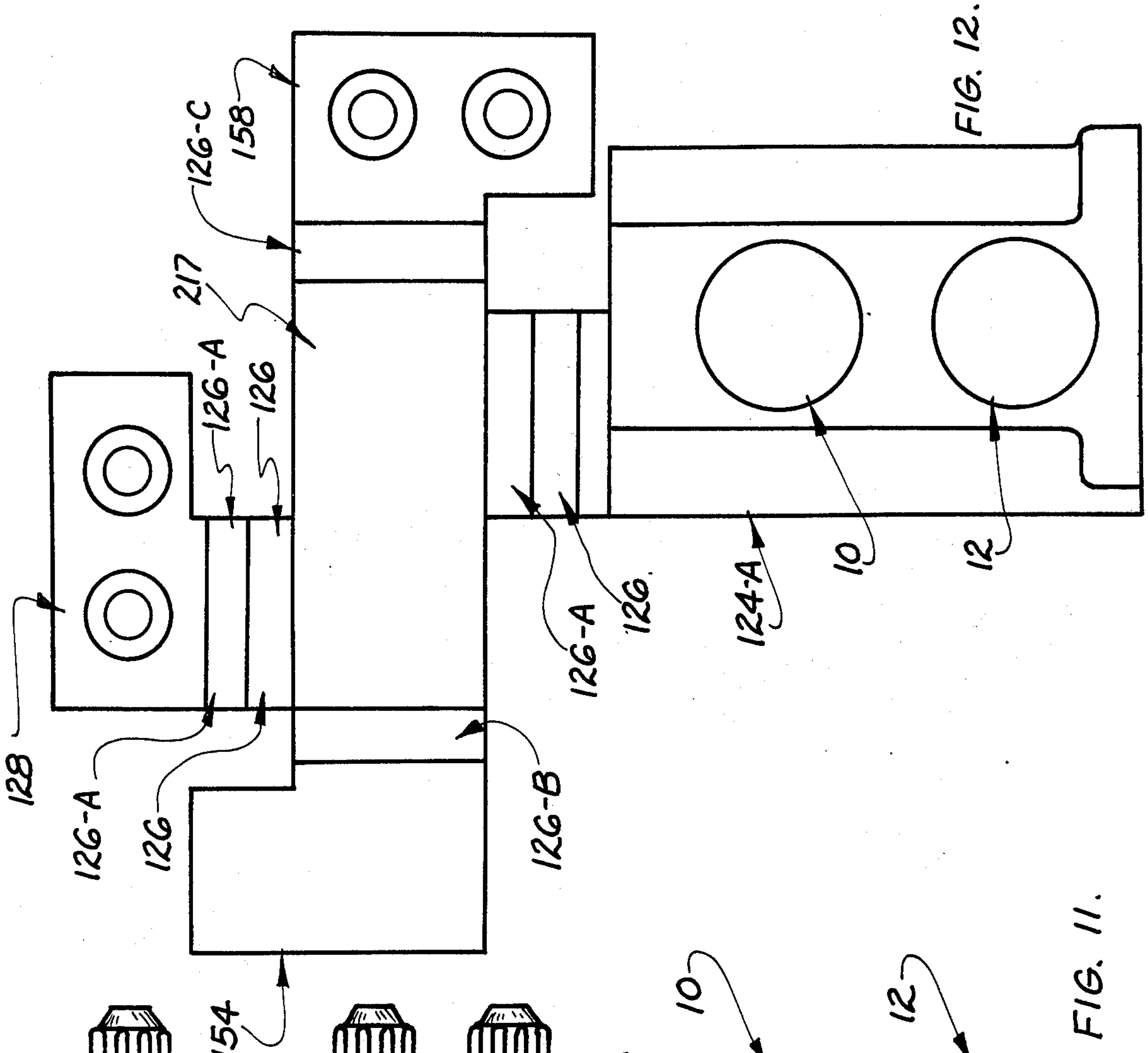
FIG. 12 is a right elevational view of the motor controller of FIGS. 3 and 4.
Figure 11:
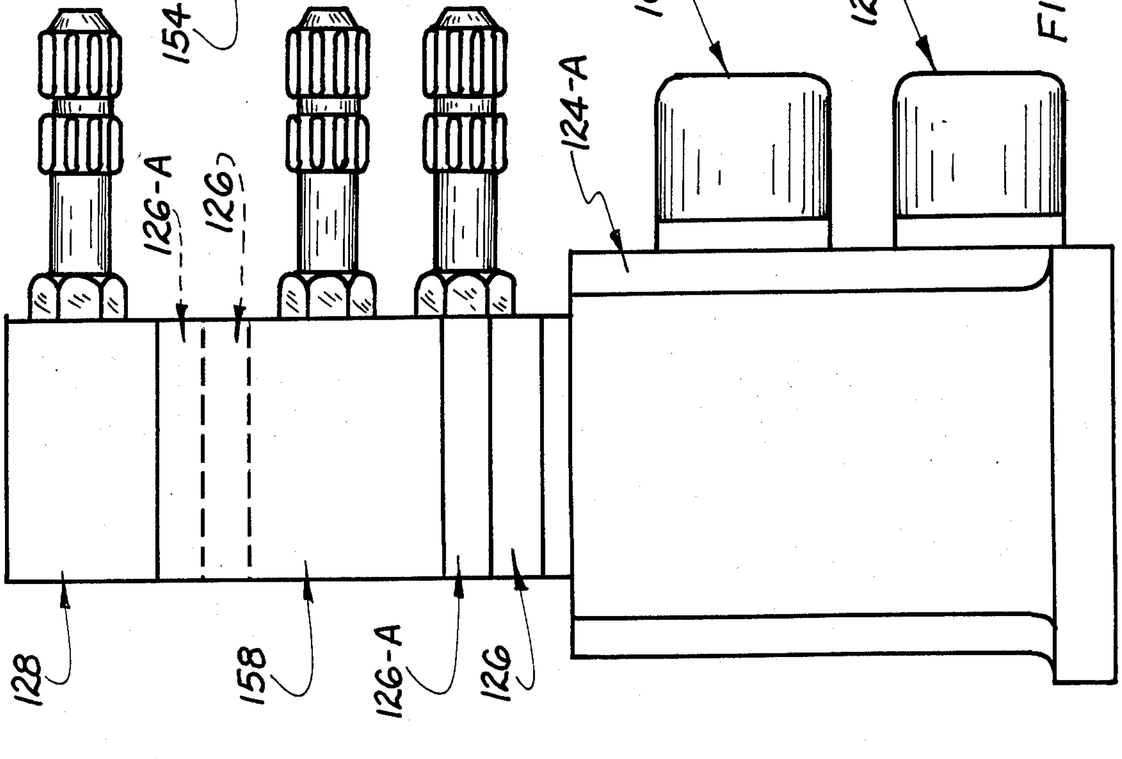
FIG. 11 is a rear elevational view of the motor controller of FIGS. 3 and 4.
Figure 15:
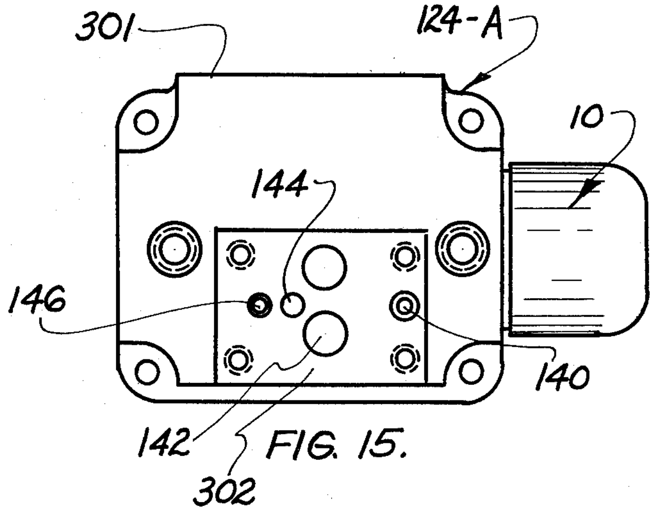
FIG. 15 is a top elevational view of the power flow module of FIG. 13.
Figure 14:
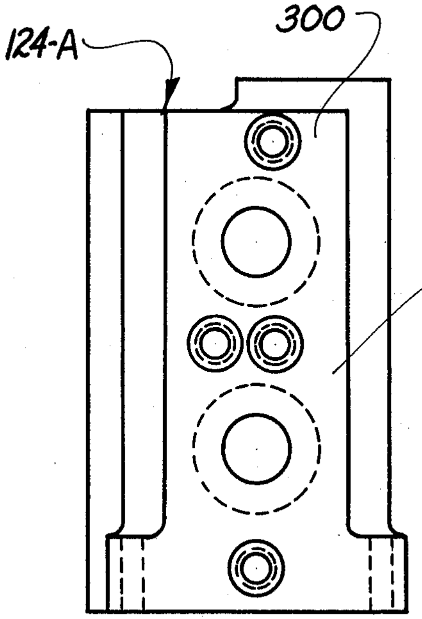
FIG. 14 is a left elevational view of the power flow module of FIG. 13.
Figure 13:
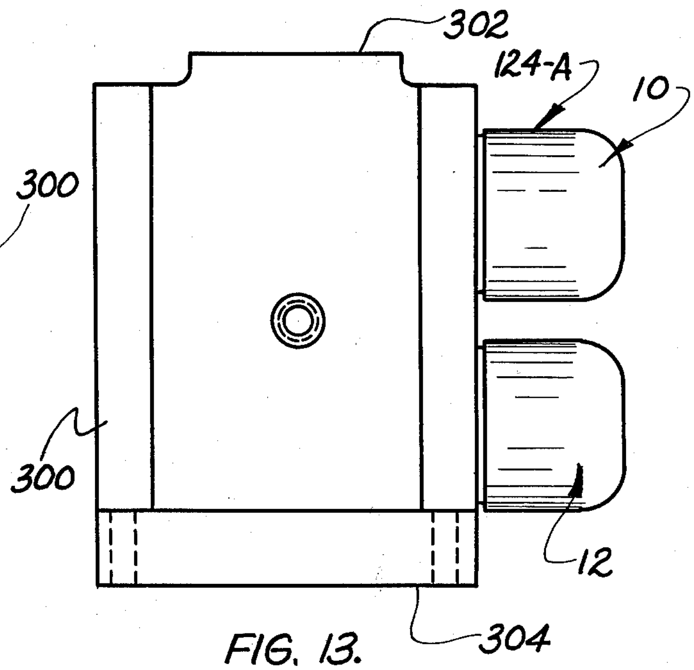
FIG. 13 is a front elevational view of a power flow module comprising a portion of the apparatus of the preceding figures.
Figure 16:
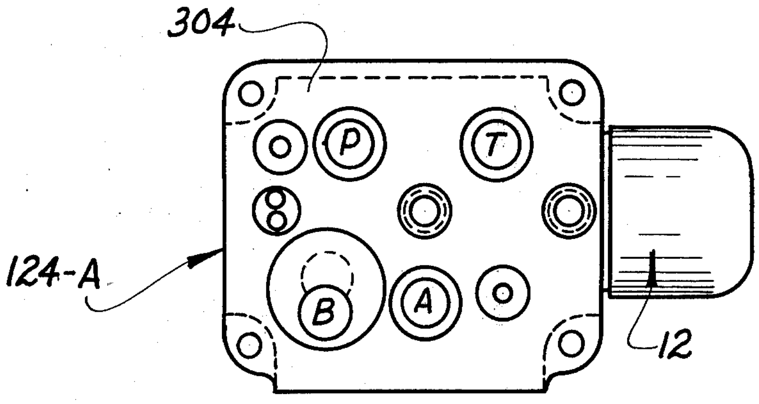
FIG. 16 is a bottom elevational view of the power flow module of FIG. 13.

In the utilization of the standardized modular components of the present invention an infinite number of control systems can be assembled depending on the particular dictations of the required control perimeters and towards this end the previously described modules utilized in the simplified motor controller of FIGS. 5–8 can be expanded in a sophisticated way to provide a motor controller wherein the standardized modules are shown in the more complex assembly of FIGS. 12–14. Such more complex assembly again includes power flow module 124-A which houses power flow elements 10 and 12. Directly connected to such power flow module 124-A are the standard spacer blocks 126 and 126-A which include standardized interfaces and porting and a signal flow center block module 217, also indicated as D herein, is joined at its standardized interface to the previously mentioned spacer module 126-A.

Continuing with the building of the array of the system of FIGS. 9–12, two additional spacer blocks 126 and 126-A connect the signal flow center block module 217 to a signal flow switching module 128, which in this array is also indicated as module J. It should be mentioned that the signal flow switching module 128 (J) is the same standardized module 128 shown in the simplified system of FIGS. 1, 2, and the circuitry of 5–8. The programming, however, in this instance of the more complex system is different with respect to the operation of the control flow from the signal block modules and is modified in various ways as will later be described in detail.

Referring once again to the signal flow center block module 217 and more particularly to the physical assembly of the more complex system of FIGS. 9–12, such signal flow center block module includes additional standardized interfaces adapted to register with the spacer block 126-B which in turn registers with spacer block 126-C and such spacer blocks, in turn, are provided with standardized interfaces and porting which register with additional signal flow switching modules indicated generally at 154, also designated as F, and 158, also designated as L.

Referring only generally to the additional signal flow switching modules, the first one mentioned, that is module 154, is programmed in this particular system of FIGS. 3 and 4 to effect a flow reducing signal flow function as well as a pump vent signal flow function all of which will be described in detail later herein with respect to the discussion of the more complex circuitry of the system of FIGS. 3 and 4.

With respect to the other flow modifying module L also indicated as 158 it should generally be stated that this module serves as a counterbalance signal flow device which modifies the effect of the signal flow on the main power flow controller elements 10 and 12. In addition this module 158 (L) also includes a logic signal flow element that serves the additional function of providing logic to the control system such that the counterbalance is selectively applied to the power flow elements when required.

FIGS. 13 through 16 illustrate the power flow module 124-A including the power flow elements 10 and 12 which represent normally centered three-way spool elements as well as the various standardized interfaces as seen at 300, 301, 302, and 304.

Referring next to FIGS. 14 through 17, such figures illustrated in section, illustrate the interior of the power flow module 124-A including the individual power flow elements 10 and 12, together with the various lands, porting arrangements and bias springs.

Figure 17:
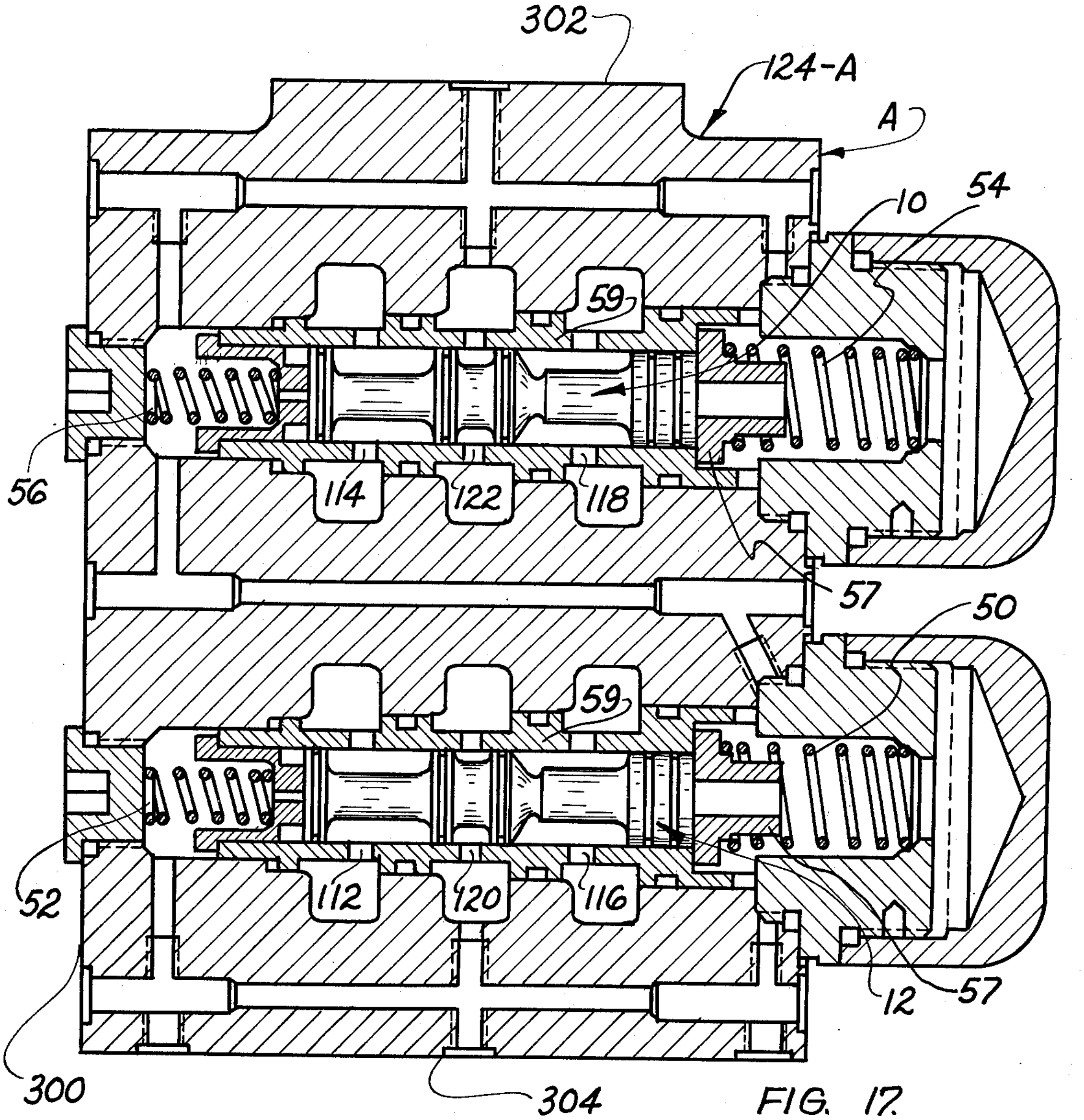
FIG. 17 is a front sectional view of the power flow module of FIGS. 13–16.
Figure 18:
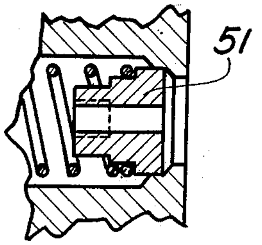
FIG. 18 through FIG. 20 are partial sectional views showing programmable options for the power flow spool elements of the module of FIG. 17.
Figure 19:
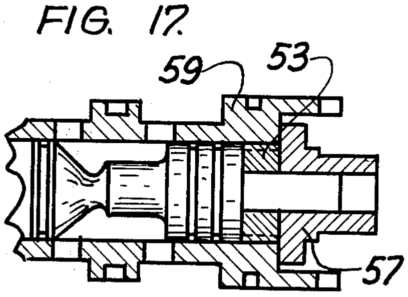
Figure 20:
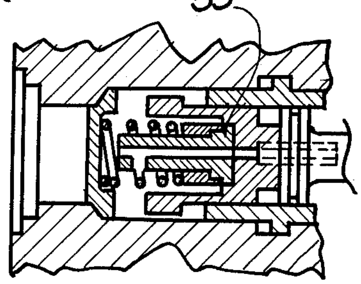
Figure 23:
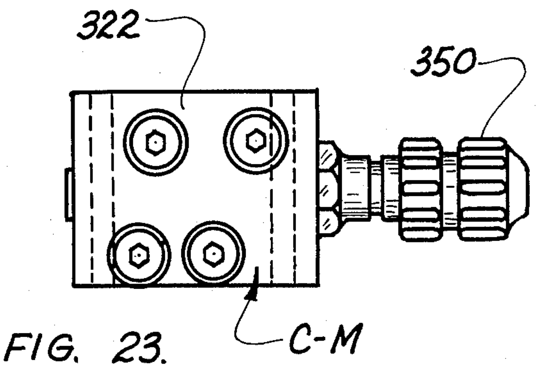
FIG. 23 is a top elevational view of the module of FIG. 21.
Figure 22:
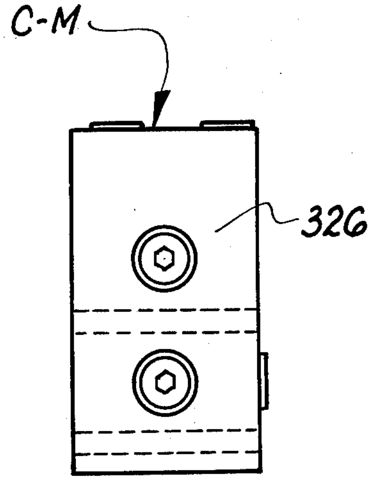
FIG. 22 is a left elevational view of the module of FIG. 21.
Figure 21:
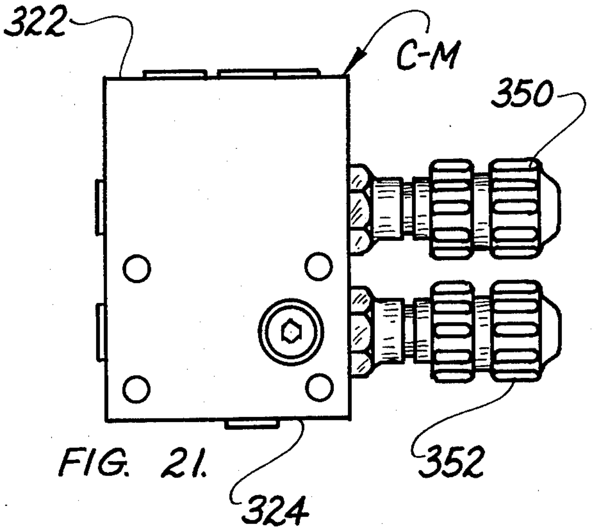
FIG. 21 is a front elevational view of a manually adjustable signal flow switching module which can be utilized in the systems of the present invention.
Figure 24:
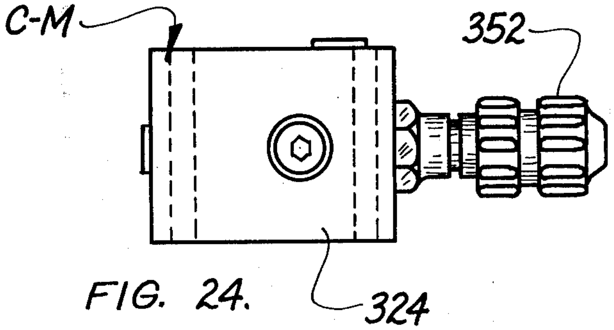
FIG. 24 is a bottom elevational view of the module of FIG. 21.

Reference is made to FIGS. 18–20 which illustrate structure for the modified programming of the power flow elements 10 and 12 of FIG. 17. In such modified arrangements the spool elements are identical to the modification of FIG. 17. Also identical are the sleeve 59 and spring adapter 57. These elements represent the basic multiple function components of universal power flow valve module that permits the programming of a wide variety of modulating and flow switch functions. It will be seen that the modification of FIG. 19 includes a spacer 53 which can be selectively utilized to change the normal position of the spool. Also the modified spring retainers 51 and 55 of FIGS. 18 and 20 can be selectively utilized in modifying the normal position of the power flow spool. Such modified programming is disclosed and described in detail in my co-pending application Ser. No. 129,785 filed Mar. 31, 1971.

Reference is next made to FIGS. 21 through 26 which illustrate another standard signal flow module which will be referred to herein as CM. Such module is not incorporated in the two typical motor controller examples of FIGS. 1 and 2 and FIGS. 3 and 4, since such examples include solenoid operated signal flow modules but they are included herein as examples of typical signal flow modules which can be selectively utilized in the programming of various fluid power devices wherein control would be effected by manually actuated flow controllers in the form of adjustable knobs 350 and 352, shown in the various figures being discussed.

Figure 25:
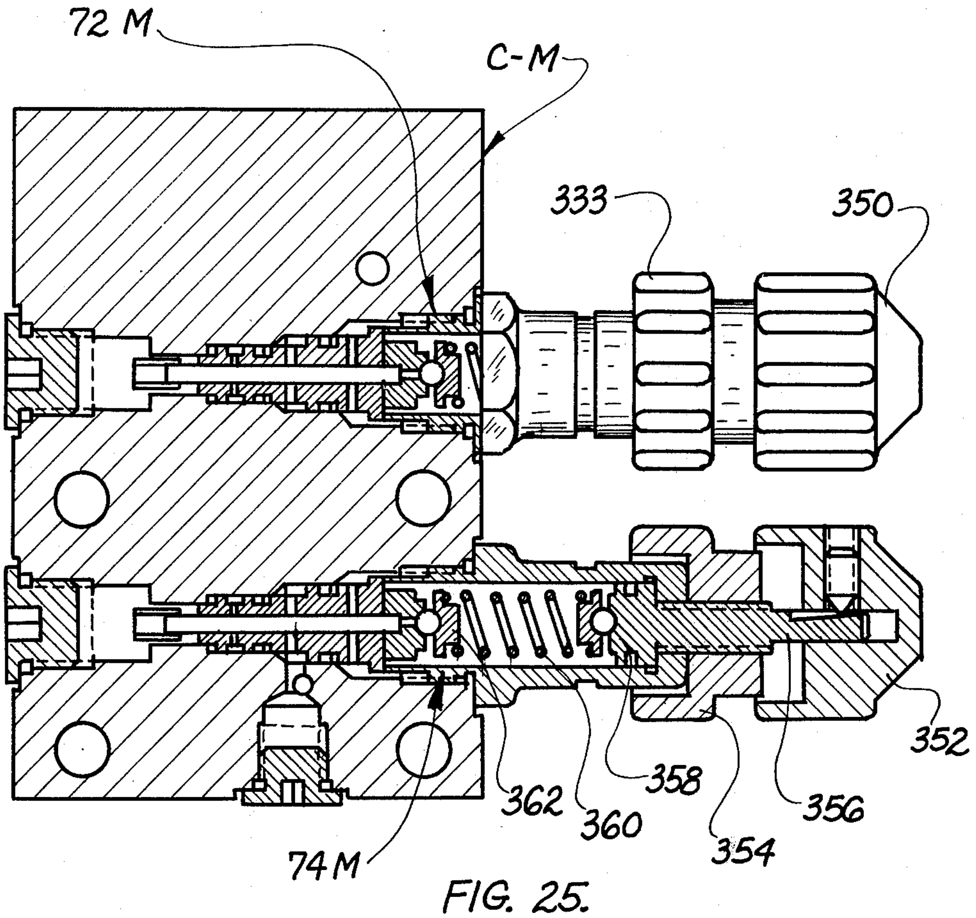
FIG. 25 is a front sectional view of the module of FIG. 21.
Figure 26:
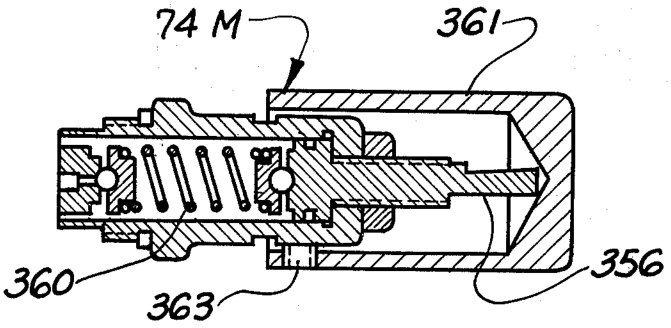
FIG. 26 is a partial sectional view showing a modified actuator for the module of FIG. 25.

FIG. 26 shows a modified manual controller which is similar to the apparatus of FIG. 25. However, in the modification of FIG. 26 the manual adjusting knobs 352 and 354 have been removed and a security cover 361 substitute therefor, with such cover including a locking screw 363 which retains the cover in place and prevents tampering with the adjusting rod 356.

Figure 29:
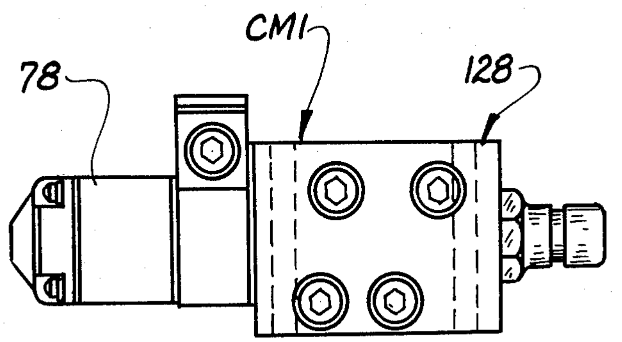
FIG. 29 is a top elevational view of the module of FIG. 27.
Figure 28:
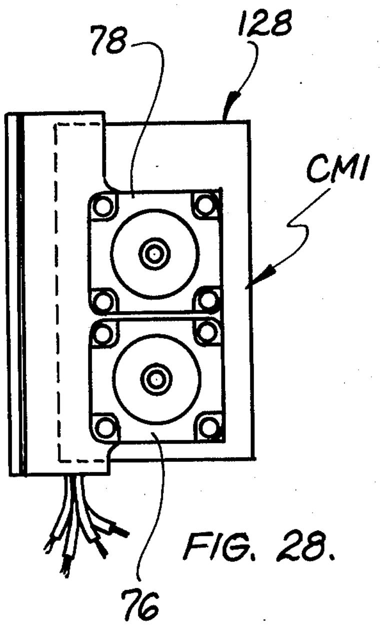
FIG. 28 is a left elevational view of the module of FIG. 27.
Figure 27:
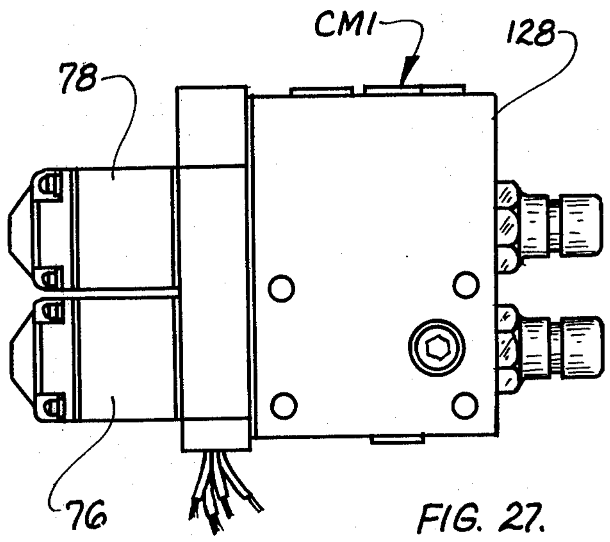
FIG. 27 is a front elevational view of a solenoid operated signal flow switching module which can be used in the systems of the present invention.
Figure 30:
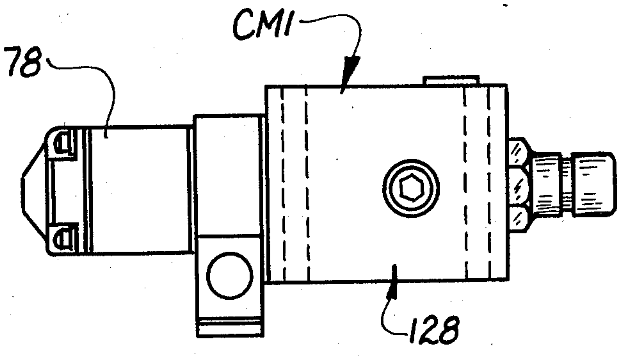
FIG. 30 is a bottom elevational view of the module of FIG. 27.

Referring next to FIGS. 29–30 here again another modified signal flow module is indicated generally as CMI. This particular signal flow module is standard and is provided with solenoid actuators 76 and 78 for the signal flow control elements such as seen at 72M and 74M in the previously described embodiment of FIGS. 21 through 26.

Reference is next made to the standardized signal flow switching module which is actually utilized in the two fluid motor controllers illustrated as examples in the present application and such signal flow module is designated generally as 128 (as well as its two programmed versions C and J).

Figure 31:
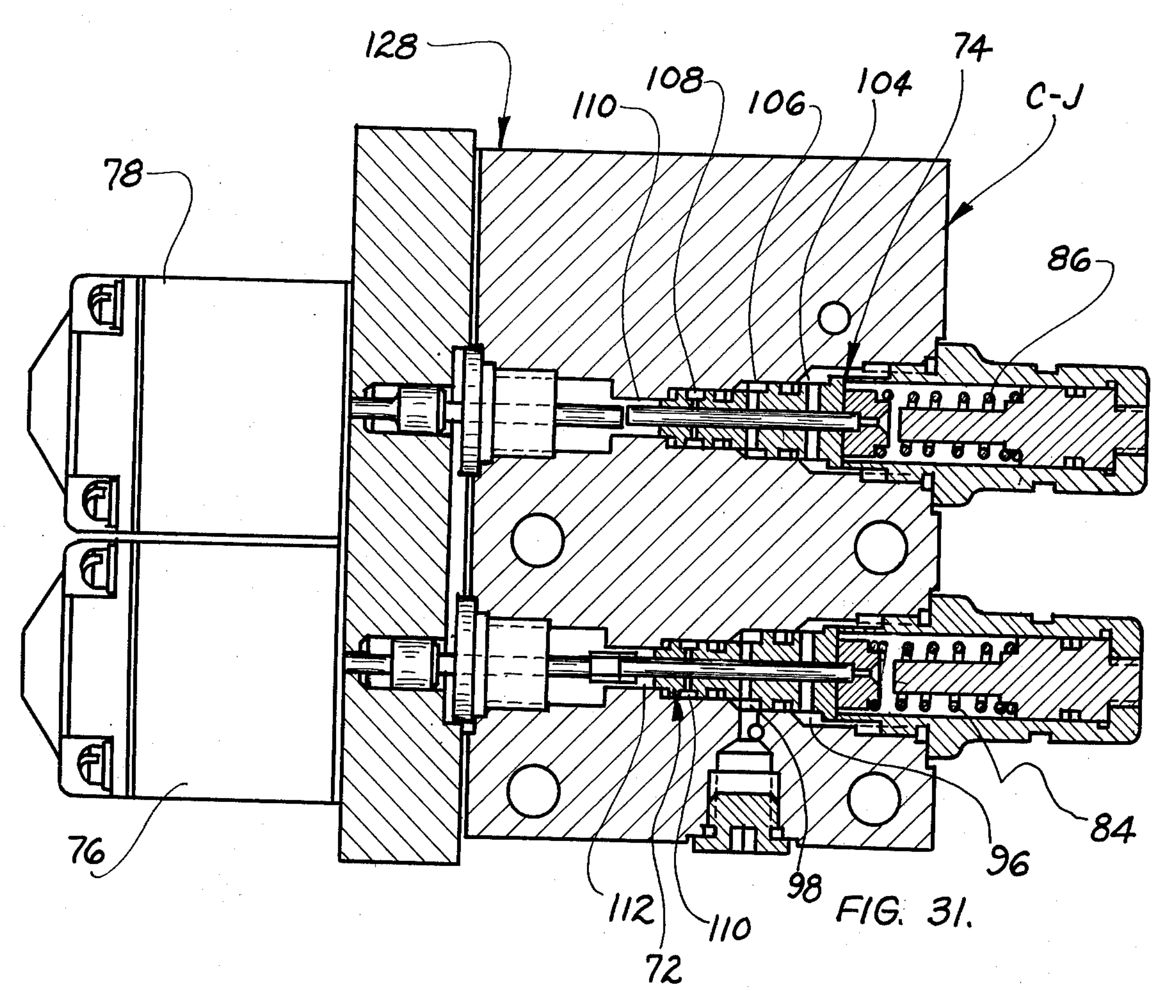
FIG. 31 is a front sectional view of the signal flow switching module of FIGS. 27–30.
Figure 32:
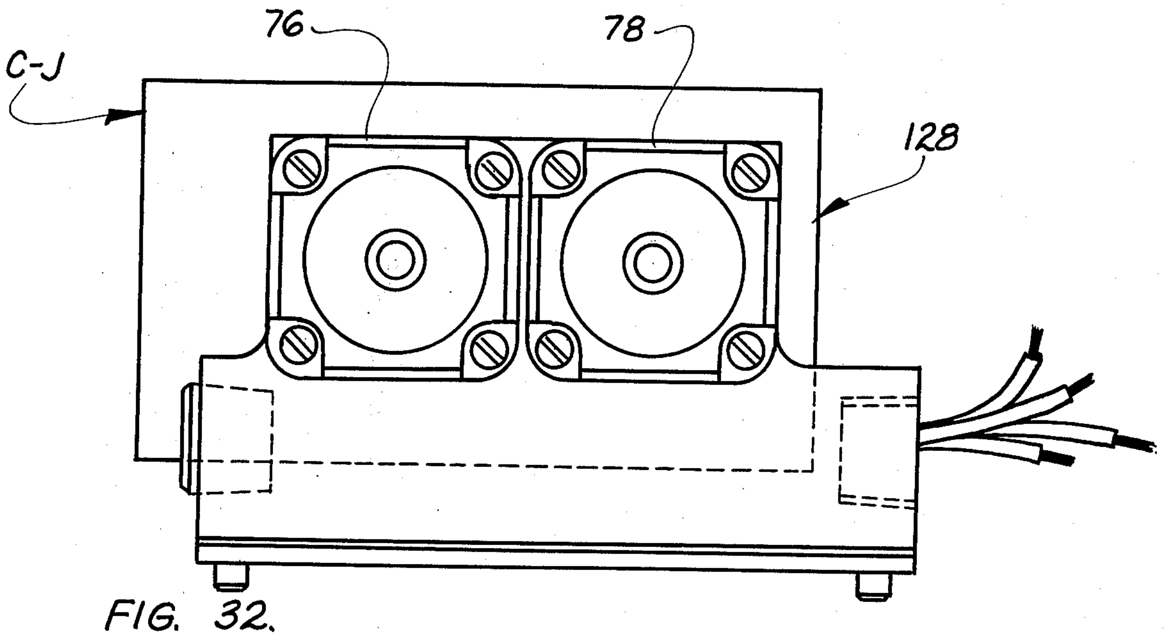
FIG. 32 is a left elevational view of the module of FIG. 31.
Figure 36:
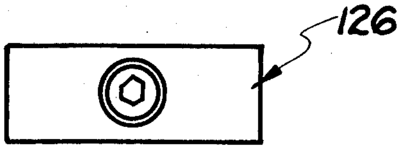
FIG. 36 is a top elevational view of the module of FIG. 33.
Figure 34:
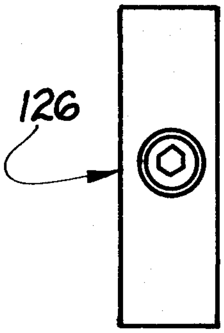
FIG. 34 is a left elevational view of the module of FIG. 33.
Figure 33:
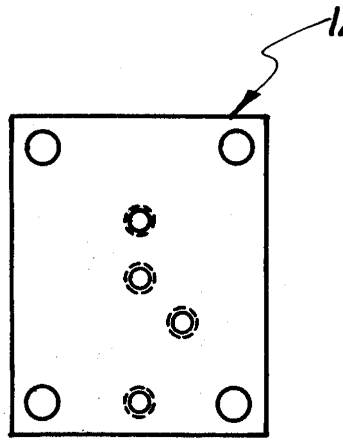
FIG. 33 is a front elevational view of a signal flow spacer module comprising a portion of the systems of the present invention.
Figure 35:
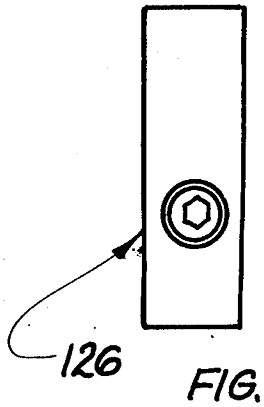
FIG. 35 is a right elevational view of the module of FIG. 33.
Figure 37:
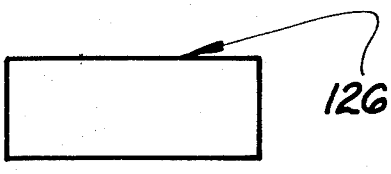
FIG. 37 is a bottom elevational view of the module of FIG. 33.
Figure 38:
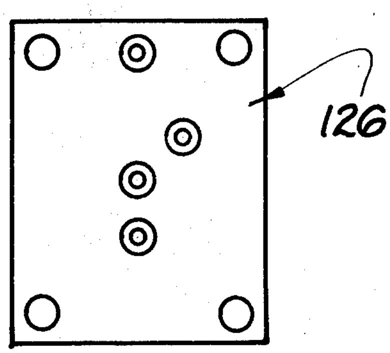
FIG. 38 is a rear elevational view of the module of FIG. 33.
Figure 42:
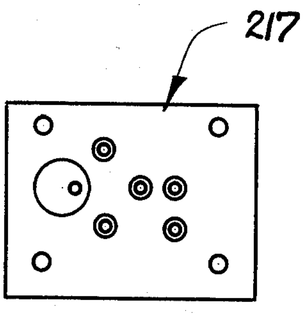
FIG. 42 is a top elevational view of the module of FIG. 39.
Figure 40:
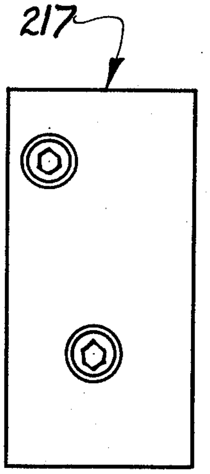
FIG. 40 is a left elevational view of the module of FIG. 39.
Figure 39:
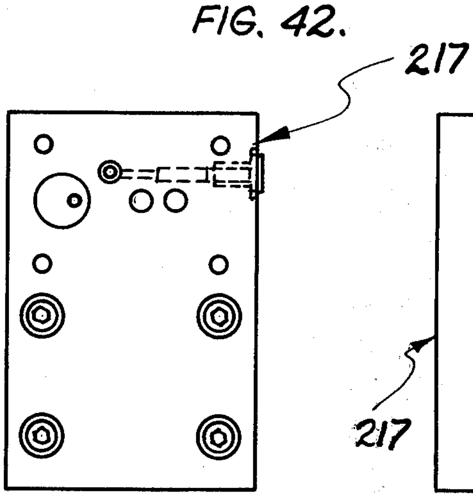
FIG. 39 is a front elevational view of a signal flow center block module comprising a portion of the systems of the present invention.
Figure 41:
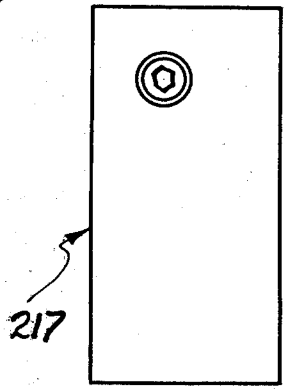
FIG. 41 is a right elevational view of the module of FIG. 39.
Figure 43:
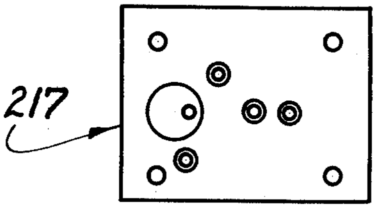
FIG. 43 is a bottom elevational view of the module of FIG. 39.
Figure 44:
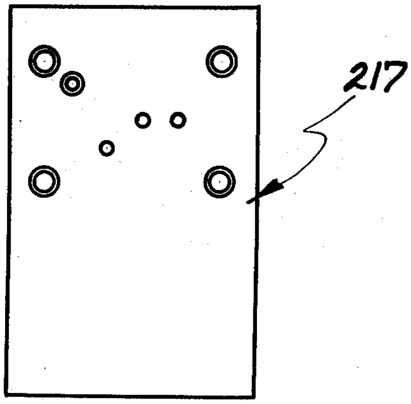
FIG. 44 is a rear elevational view of the module of FIG. 39.

As seen in FIGS. 31 and 32, the signal flow switching module 128 is selectively actuated by energization of the solenoids 76 and 78 and is provided with a standard conduit interface arrangement and standardized porting as will be noted from the numerals which correspond with identical elements in the circuitry set forth in FIGS. 1 through 4 and described in detail later herein.

Referring next to FIGS. 33 through 38, these represent elevational views of all the sides of the standardized spacer modules 126, 126-A, 126-B, and 126-C.

Here again it will be seen that the interfaces of these spacer modules and the standardized porting arrangement permit these spacer modules to be utilized in a plurality of selected arrays so as to permit the fabrication of any one of an infinite number of motor controllers of the type exemplified by the circuitry of FIGS. 1 through 4 later to be described in detail herein.

Reference is next made to FIGS. 39 through 44, which illustrate a signal flow center module indicated generally at 217 (also designated by D in the relatively complex motor controller) the circuitry of which is shown in FIGS. 3 and 4 and described in detail later herein.

Here again the standardized interfaces and conduit porting are provided on center module 217 (D) such that the module can readily register with and receive in mounted relationship any of the other standardized modules in various selected arrays so as to provide an appropriate motor controller for the particular demands dictated by the requirements of the particular system.

Reference is made to FIGS. 1 and 2 which illustrate a typical and relatively simple control system for a fluid motor which system embodies a novel aspect of the present invention wherein two standard three-way power flow elements 10 and 12 are programmed to operate in push-pull arrangement and are controlled from standard signal flow elements 72 and 74. The system further incorporates a unique packaging principle in the form of a standardized modular approach with FIG. 1 showing the general programmable pattern for this particular arrangement. The drawing of FIG. 1 is transposed after programming to the simplified drawing, FIG. 2, the latter showing only those passages that are used in this particular program. The unused passages have been erased as well as unused control orifices to facilitate understanding the modular passage actually used of the number of standard passages provided in the standard modules.

As seen in FIG. 1 a pump 136 is connected to port T and line 14 entering a control module indicated generally at 124 which includes two three-way standard power flow spool elements 10 and 12. Module 124 is depicted in schematic form with the schematic indicating the port flow by symbols rather than by cross-section. Tank port T and line 18 are connected to a reservoir 138 which serves as a low pressure region for receiving the flow.

Ports A and B, modules 124, are connected to a fluid motor represented as a power cylinder 130. A passage 20 leads to a chamber 132 considered the bore side of the cylinder having the greatest cross sectional area, and line 16 connects with chamber 134, the rod side of the cylinder, the side with the smaller area.

Referring next to FIG. 2 and power flow elements 10 and 12 basic power flow possibilities will be considered from pressure line 14 and tank line 18 to and from the fluid motor. When power flow element 12 is shifted against a spring 52 by a low pressure control signal at line 30, line 20 is connected to line 18 which means that the bore chamber 132 is connected to reservoir by passages 18 and 20. At the same time a pressure signal is imposed on power flow element 10 via line 32 and the spool is shifted against spring 54 which connects line 14 from the pump to line 16 to rod chamber 134 of motor 130. As a result flow occurs from pump 136 to chamber 134 of the motor and bore chamber 132 is connected to tank. Therefore, the cylinder will retract.

If operation of both of these power flow elements 10 and 12 is reversed, by reversing the pressure signals, the flow to the motor 130 is reversed and the piston will be extended. In doing this the control signals are via line 26 against spring 56 and via line 24 against spring 50.

With the basic possibilities of switching the two power flow three way valve elements 10 and 12 it will be understood that it can be done in a push-pull arrangement such that one goes one way and the other goes the other way. Also the procedure can be reversed, or conversely both of the power flow elements can be operated in the same direction which would pressurize the pilot lines 24 and 32 by pressure against springs 50 and 54 which connects pressure line 14 to both lines 16 and 20. This applies fluid pressure on both of the motor chambers 132 and 134. Due to the area differential between the bore and rod chambers of the particular motor a regeneration effect occurs whereby the speed of the motor 133 is increased. Such regeneration operation is set forth to demonstrate that the power flow elements 10 and 12 can be actuated either opposite or together, in unison or anyway desired to put the power flow to the particular control surfaces.

It should be mentioned that the two power flow elements 10 and 12 include bias springs at each end of the control elements.

It will now be understood there are four power lines to the two power flow elements 10 and 12. Element 10 is controlled by signal lines 26 and 32 whereas power flow element 12 is controlled by power line 24 and 30. It remains then to apply pressure signals in any degree from any kind of sensor or switch or signal element at these four lines to accomplish the selected modular switching function of the power flow elements.

As a particular example, consider the power flow element 10 in a basic program, which will be traced back through signal flow elements and signal flow modules. Line 32, for instance, is connected to the power flow element 10 through an orifice 34 and a plug arrangement 36 which is in this case shown plugged. Line 28 leads from a signal flow element in module 128 with such signal flow element being indicated generally at 72. Signal flow element 72 consists of solenoid operated three-way spool 80, solenoid 76 and bias spring 84 shown in a normally open position such that line 28 connects to port 98 which in turn is connected to port 96. Port 96 is connected via lines 64, 146, 58, and 18 back to reservoir 138. Also signal line 32 of power flow element 10 is connected to the reservoir via the above lines and port connections through the signal flow element 72 in a normally unenergized state that is with solenoid 76 de-energized.

Referring to power flow element 10, the other signal line 26 is connected via orifice 40 to line 22 which in turn goes to the other signal flow element 74 which includes spool 82, solenoid 78 and bias spring 86. Line 22 connects to port 106 which in turn is connected to the port 104 by the open spool 82. Port 104 is connected to the line 66 which in turn connects to the line 58 and henceforth back to tank as described above. In this sense we have the power flow element 12 connecting its passages to reservoir in the depressurized state with solenoid 78 de-energized.

At the same time we have the signal line 30 on the opposite power flow element 12 connected through orifice 44 to line 28, and then to signal flow element 72 in the manner just described. The opposite signal line 24 of power flow element 12 is connected to reservoir 138 by the same lines as element 10.

In view of the above it will now be seen that all four control surfaces on the power flow elements 10 and 12 are connected to reservoir 138 through the normally open spools of signal flow elements 72 and 74 in their de-energized state. This means that in such normal position the bore chamber 132 of fluid motor 130 is isolated from pump 136.

When it is desired to extend the rod 133 of fluid motor 130, pressurized fluid from line 14 is directed to line 20 and line 16 is connected to reservoir. This is accomplished by energizing the appropriate signal flow elements. It can be seen that it is necessary to pressurize line 24 and 126 via line 22 leading from signal flow element 74. Pressurized fluid from pump 136 is delivered to both signal flow elements 72 and 74. Lines 60 and 62 lead to signal flow element 72, and line 60 leads to signal flow element 74. When solenoid 78 of signal flow element 74 is energized spool 82 moves against bias spring 86 thereby connecting port 108 to port 106 and line 22 which in turn delivers a pressure signal to signal line 24 via orifice 48. Power flow element 12 is thereby moved against bias spring 50 so as to connect pressure line 14 to line 20 and pressurized fluid is delivered to chamber 132 of motor 130.

At the same time a control signal from signal flow element 74 is also applied via line 22 and orifice 40 to signal line 26 of the other power flow element 10. This shifts the power flow element in the direction to connect the line 16 to line 18 leading to reservoir. Therefore motor 130 is extended by pressurized fluid delivered to chamber 132 with the rod chamber 134 connected to reservoir. This is accomplished by actuation of solenoid 78 of signal flow element 74 giving a push-pull action to the two power flow elements. The other signal flow element 72 being de-energized, maintains the opposite control lines of power flow elements 10 and 12, that is line 32 on power flow element 10 and line 30 on power flow element 12, exposed to reservoir and hence not pressurized.

Consider next that when solenoid 78 is de-energized all of the signal control pressures through power flow element 74 are exposed to reservoir and the power flow elements 10 and 12 are centered by the control springs whereby movement of motor 130 terminates. Now if solenoid 76 of signal flow element 72 is energized against bias spring 84 spool 80 connects port 100 to port 98 and line 28 which connects the opposite control lines as previously stated on both power flow elements will proceed to tank.

When the other solenoid 76 is energized to actuate the other signal flow element 72 then the opposite control lines of the power flow elements 10 and 12 are pressurized so that fluid is delivered to rod chamber 134 and the other chamber 132 is exposed to reservoir. Motor 130 then moves in reverse.

It will now be apparent that two small signal flow elements 72 and 74 serve to selectively pressurize four signal flow control lines in the power flow elements 10 and 12 in either push-pull or in unison or any combination of these events to provide for selection of any of these positions in a switching or modulating proportional manner so as to control the signal pressures in line 24, 26, 30 and 32.

In the elementary example of FIGS. 1 and 2 power flow elements are simply operated in opposite push pull and also in unison and it is obvious that it is possible to interrupt pilot signals responsive to some other control function, logically or through sensors, and thereby cause either of the power flow elements 10 or 12 to function independently of the opposite power flow element. For example, if power flow element 12 is switched via a signal flow element such that pressurized fluid is delivered to motor chamber 132 pressure signals can be interrupted that would be normally going to signal line 26 to connect the chamber 134 to reservoir and indeed cancel them such that chamber 134 is blocked by power flow element 10 and then arranging matters such that a sensor sensing the pressure in motor chamber 134 will open power flow element 10 responsive to chamber pressure rather than to an arbitrary signal and allow the pressure in 134 to return to the reservoir 138 in a modulating manner at some predetermined pressure level which would be dictated by the sensor which is measuring pressure in line 16 and operating power flow elements 10. This will be described in a more elaborate system programmed from these signal and power flow elements.

It should be pointed out that the signal flow elements 72 and 74 are arranged in modules represented by 126 and 128 in FIGS. 1 and 2 in a programmable pattern which consists of standard modules or blocks which package the elements and which incorporate four-duct arrangements shown in FIG. 1. Modules 128 further include a multiplicity of programmable orifice and plug arrangements such as 46–48 whereby various arrangements of signal flow programming can be accomplished.

It should further be pointed out that the signal flow modules such as 126 and 128 have standardized port patterns and standardized duct connections such that they can be joined one to another in a wide range of package arrangements to accomplish almost any kind of control technique. Certain outside lines such as line 22 in FIG. 1 are sometimes used to conduct signal flow from one port to another outside of the integral four duct arrangement and this is accomplished with very small signal flow lines that are easily arranged. Line 22 which is shown extending outside of the modules so as to transmit pressure signals from port A16 to A14, is an external line since this connection does not lend itself to the standard internal four-duct system.

Reference is next made to a more complex control system of FIGS. 3 and 4 which incorporates the same techniques of using signal flow and power flow modules to provide more sophisticated control of power cylinder or motor 130. The system of FIGS. 3 and 4 again functions as a motor controller using the same twin power flow elements in a power flow module 124-A but in this more complex circuit module 124-A is programmed to receive different signals and to effect different types of operation of motor 130. In addition, in the circuit of FIGS. 3 and 4 more signal flow modules are required for the more complex control. The original solenoid operated modules 128 are again used for basically causing four-way switching action. This module effects primarily the same function with one difference in that low pressure signals will be supplied from another signal flow module as a power supply for the solenoid pilots in a manner later to be described.

An additional signal flow module used in FIGS. 3 and 4 comprises a reducing module which functions to reduce the primary pressure to some lower level for more smooth switching and to provide a low pressure reference source for switching and logic control.

Referring generally again to the motor controller of FIGS. 3 and 4, the system incorporates a pump venting or low pressure logic element which will be described in the extending and retracting operations of the motor. Operation is at lower pressures than normally occur and there is also a counter balance pilot which detects the signal pressures and functions to develop an opposing pressure to the feed out control pressure which will operate one of the power flow elements 10 or 12 controlling rod chamber 134 as a two-way valve. Also, the control system includes a logic element that functions to automatically vent the power flow modules in a prescribed manner such that the counter-balance mode will not function during other control functions.

In addition to these additional control functions, the system is adapted for regeneration, simultaneous operation of two signal flow elements so as to connect the rod chamber motor to the bore chamber for phase approach control of the motor.

Referring to FIG. 3, a pump 136-A which is pressure compensated variable displacement provided with a control pilot 260 connected to a control circuit which will be described later to cause a certain action of the pump under certain conditions connects to power flow module 124-A at port T. The output from pump 136-A is connected to the power flow module at port P.

The bore chamber 132 of fluid motor 130 is connected to module 124-A at port A and the rod chamber 134 is connected to the module at port B.

In the interest of simplifying the description the control section will first be described. The description will next proceed to the power flow elements with respect to how they respond to the control signals.

As seen in FIG. 3, pressurized fluid from pump 136-A enters line 60 through spacer signal flow spacer modules 126 and 126-A and into the main signal flow module 217 upon which are mounted other signal flow modules and signal valve modules. Line 60 proceeds through signal block 217 up through signal flow spacer module 126-A into the signal flow module 154. Pressurized fluid in line 60 enters a signal flow reducing valve element 162 at port 194 which includes a normally open spool 170. Signal flow reducing valve element 162 normally connects 194 port to 196 port since a bias spring 178 normally maintains spool 170 in an open position.

Fluid from port 196 is conducted into line 248 and at 248 a feed-back pressure through orifice 222 and line 250 is directed to the end 169 of spool 170 through port 192. If the pressure in line 248 rises to a certain preset level on spring 178 then spool 170 will close off port 194 to 196 in the modulating control manner to maintain pressure in 248 regardless of the pressure in line 60.

This provides a low pressure signal level pressure for operation of the control circuit at line 248 always present in line 256 back through signal flow module 217 through signal flow spacer modules 126-B and 126 to solenoid actuated module 128 in a similar manner to the high pressure control flow that was delivered to such module 128 in the system of FIGS. 1 and 2.

With reference to solenoid actuated signal flow module 128, line 256 delivers the low pressure signal to signal flow element 72 and also is conducted to the signal flow element 74 in the same manner as previously described.

Signal flow elements 72 and 74 function as previously described but they control the power flow elements 10 and 12 in a slightly different manner through the function of certain logic elements under certain conditions.

The output from signal flow element 72 is at port 98 which connects to line 28 and provides signal to be used over in the power flow module 124-A to be described later. The output from signal flow element 74 is at port 106 which connects to line 22 which then passes to lines 262 and 264 to be used elsewhere in the control to be described later.

Referring back to signal flow module 154 and the low pressure signal flow in line 248, the reduced signal pressure is conveyed via line 256, orifice 220, line 258 and port 184 to the end 171 of a spool 168 in the pump vent element 160. Such single pressure acts against the bias spring 176. In this respect the low pressure oil would have opened the spool 168 to connect port 186 with port 188 therefore line 260, and then to line 248 which is the low pressure control oil. As this happens low pressure oil is conveyed to line 250 which will be described later according to its action on the pump circuit of spool 168. The other end of pump vent element 160, the spring end is connected to a port 190 which is also connected to line 262 which is connected or conveyed to the output of the signal flow element 74 such that when solenoid 78 is actuated a low pressure control flow is supplied to line 262 which is conveyed to the spring end of spool element 168 therefore balancing the low pressure oil at the other end 171 of spool 168. When this occurs bias spring 176 moves spool 168 and slight opening of that element occurs. In this respect if solenoid 78 of element 74 is de-energized line 262 is connected directly to the reservoir via ports 106 and 104 and lines 58 and 18 to reservoir 138. Hence it is seen that spool 168 is pump vent module 160 will open if solenoid 78 is de-energized, and closed when solenoid 78 is energized.

When pump vent spool 168 is open then low pressure oil is conveyed to line 260 and henceforth to the previously mentioned control 261 of pump 136-A. The action of this low pressure oil is to cause pump 136-A to respond only to low pressure. For instance if the reducing valve element is set at 200 psi the pump also will only pump 200 psi because of the action of line 260 being the monitor that sets the pump pressure. If line 260 is blocked by the action of pump vent spool 168 being closed the pump will then go to its maximum pressure established by internal controls in the pump 126. Hence it is seen that pump vent signal flow element 160 represents a pump low pressure control.

Reference is again made to FIG. 3 for the purpose of describing other signal flow modules that are mounted on signal block 217. Signal flow module 158 includes a counter-balance pilot element 164 that includes a counter balance spool 172, bias spring 180 and the various ports to be described. A port 200 leads to the bias spring chamber and such port 200 is connected back to reservoir via line 270, orifice 268, lines 58 and 18. This means that the spring chamber is always vented to tank. The other end 189 of the counterbalance spool 172 is exposed to a chamber connected via orifice 224 and lines 280 and back to the rod chamber 134 of the fluid motor 130. Hence the rod chamber pressure is sensed and functions as a pilot pressure which will operate spool 172 in a modulating manner when required.

It should be mentioned that port 202 is connected via external line 272 to signal flow module 124-A. Line 272 includes orifices 228 and 236, the action of which is later to be described.

If signal pressure in line 280 coming from the rod side of the motor reaches a predetermined value set by spring 180 then pilot spool 172 will open port 202 to port 200 and reservoir via orifice 268. Hence it will be seen that a pilot signal flow is drawn from module 124-A to effect counterbalance control later to be described.

Reference is next made to another signal flow element in module 158 in the form of a counterbalance logic element indicated generally at 166. Such element includes counterbalance logic spool 174 and a bias spring 182. Under certain conditions this logic element will perform either center or isolation functions eliminating the effects of counterbalance under certain control conditions. For example line 284 coming from power flow module 124-A through orifice 226 and through line 282 into port 214 will apply a pressure signal to the end 185 of counterbalance logic element 174 and operate it under certain conditions. Normally line 278 entering port 210 is open to port 212 through open spool 174, with line 276 leading back to module 124-A. This represents a normally open logic function and will be closed by pressurized fluid at port 214 when pressure signals require this.

Referring again to counterbalance logic element 166, port 208 is directly connected to the reservoir 138 via line 139 so that the spring chamber 182 is always vented with no pressure indicated.

It will be understood that the above mentioned signal flow elements and signal logic elements are all arranged to effect a certain control function for the power flow elements 10 and 12 under certain conditions to be described herein.

As seen in FIG. 3, pressurized fluid from the pump 136-A enters power flow module 124-A through line 14 which connects to the two three-way power flow elements at 112 and 114. The reservoir 138 is connected through line 18 to ports 116 and 118 of the power flow elements. Also, the flow to and from fluid motor 130 will proceed through module 124-A via lines 280 and 20 in the manner previously described.

One of the power flow elements 10 operates the rod chamber 134 which is connected via port B and line 280 to port 122. The other power flow element 12 operates the bore chamber 132 of fluid motor 130 which is connected via line 20 and port A to port 120. Bias springs 52 and 50 as previously described center power flow element 12, and bias springs 54 and 56 serve the same function for power flow element 10. A manual adjustment 242 is provided to limit the flow from port 120 to port 116 during the return flow to reservoir 138 for decompression fluid control of power flow element 12. It is a mechanical adjustment and it is in no way affected by the control signals.

The other rod side power flow element 10 includes a volume of oil 240 which is simply a stabilizing volume of oil to cushion the rate of change of pressure rises in the control signal area as will be described later herein.

Starting with operation of fluid motor 130, when it is desired to rapidly extend cylinder rod 133, by pressurizing fluid in chamber 132 regeneration is accomplished by pressurizing both chamber 132 and 134. This is accomplished by a sort of a short circuit action in which the pressurized fluid really operates on the area of the rod indicated at 133 and you get a much higher flow rate around the loop than would normally be supplied by the pump. This will happen according to the ratio of areas such that the cylinder will move out as if the pump flow is applied to the area of the rod 133, and is generally referred to as regeneration.

In order to accomplish such regeneration both solenoids 76 and 78 are actuated such that pressurized fluid in line 14 is delivered to both rod and bore lines 20 and 280.

Assuming solenoid 76 and 78 are energized the low pressure control fluid is from signal flow element 72 through lines 28, free flow check 36 with plug 34 in place such that no orifice exists, and then via line 32 into spring chamber 56. This shifts the spool of power flow element 10 so as to connect line 14 to line 280 and deliver pressurized fluid to rod chamber 134 of motor 130. From the other signal flow element 74 the flow is via lines 264, and free flow check 46 into the top end 13 of power flow element 12. This shifts power flow element 12 in the direction to connect line 18 to line 20 and block port 112 from the tank. Hence it is seen that both bore chamber 132 and rod chamber 134 are connected to the pump line 14 directly and regeneration takes place. Also it will be noted that high pressure signals were delivered to both spring chamber 52 and spring chamber 56. Looking at power flow element 12 it will be noted that line 28 coming from signal flow element 72 would have normally been applied to the spring chamber 50 through an orifice bridge via line 286 through orifice 44, line 30, and orifice 246 to the reservoir 138. This means that pressure in line 286 is atenuated as it reflects the pressure in control line 30 to approximately one-half of its value because resistances of orifices 44 and 246 are approximately the same. The relative resistance values could, of course, be any combination but in this example they are made approximately the same such that there exists one-half the control pressure in line 30 as compared to what would normally have been present in line 24 from element 74 via line 264. As an example suppose 300 psi is present in line 264 and therefore in line 24 at the top spring chamber 52 moving the spool of power flow element 12 downwardly, we would then have only 150 psi in line 30 coming from solenoid signal flow module 72 and therefore the element would move down since there is more pressure in chamber 52 than chamber 50. This will be referred to herein as bridge biasing and when both solenoids are on for other functions and it is desired to move the elements in different directions it is necessary to atenuate the pressure signal in one direction. Hence override occurs to cause the elements to move in unison.

Referring to power flow element 10 pressurized fluid from low pressure signal 28 proceeds through check valve 36 into line 32 and spring chamber 56 and moves the spool down as previously described. The other spring chamber 54 must be connected to tank or the spool cannot move. Line 278 connects this spring chamber 54 with signal flow logic element 166 which is normally open to pressure line 16 which connection must be changed. However, pressurized fluid from 28 via line 284 closes the logic element 166 to pressure line 278 and 276 forcing a block. It also in addition opens line 278 to reservoir via port 208 as spool 174 shifts against bias spring 182. So essentially spring chamber 54 of power flow element 10 is vented to tank when both elements 72 and 74 are energized and such chamber is blocked off from rod pressure line 16. It will now be seen that when the elements move in unison, with both solenoids on, and spring chambers 50 and 54 were taken care of by logic and bridge balance techniques.

It will be recalled that the pump vent signal flow element 160 would have been in a normally open state had solenoid 78 been deenergized. Since solenoid 78 is energized the pump vent signal flow element 160 is closed and the pump is capable of going to full pressure as set internally in pump 136-A. Generally it takes a high pressure to regenerate a system. Now as regeneration is occurring and the cylinder moves out fast the rod 133 will hit an electrical switch 135 which detects when the fast movement should stop and the system should go into some kind of a controlled feed operation. When limit switch 135 is actuated it will immediately deenergize solenoid 76 which has the effect of centering power flow element 10 in a closed center position. However, when element 72 is deenergized the pressure in line 28 is immediately reduced to zero reservoir level. When this occurs then logic element 166 opens again via bias spring 182 and connects the rod chamber line 280 with spring chamber 54 through check valve 231, orifice 233, and lines 276 and 278. In addition, it will be seen pressure line 280 is connected through open plug 238, orifices 228 and 236 leading to line 32. Therefore, the pressure in line 280 is connected across the element 10 into both spring chamber 54 and 56 except that it moves orifice bridges as they might apply. Recalling that line 280 was sensing the pressure in rod chamber 134 counterbalance pilot signal flow element 164 with spring 180 set at a certain pressure say 500 psi we now have this element reponding to line 280 pressure. Regeneration is now terminated and power flow element 10 goes into the block position until pressure in line 280 rises to the level set by spring 180 of counter balance pilot 164. Above this pressure the counterbalance pilot 164 begins to open connecting line 272 via port 202 and port 200 to line 270 through orifice 268 to line 58 connected to reservoir 138. As the pilot flow develops through counter balance pilot 164 there is a pressure drop across orifice 228 and therefore spring chamber 56 begins to receive lower pressure than spring chamber 54.

Therefore the spool of power flow valve module 10 will begin to move to the open position under controlled modulating pressure conditions and line 280 and port 122 will be in a modulating open position 118 and line 18 back to reservoir 138. Hence flow from the rod chamber 134 of motor 130 will be held at a fixed pressure and will relieve to reservoir 138 through power flow element 10 under controlled conditions set by the counterbalance pilot element 164 sensing pressure in line 280 and acting across the orifice bridges to move the elements in power flow element 10.

Orifice 236 is a simple damping orifice for preventing the flow from becoming too high as the counter balance pilot 164 moves to the open or modulating position. The chamber 240 is merely a resilience to provide stability of the elements when they are under pressure control operations.

When the high pressure fluid flows across power flow element 10 we now see that spring chambers 56 and 54 operate at much higher pressure than would be true when the low pressure pilots operation and in this regard check valve 36 closes so that no high pressure fluid is directed back into line 28, the low pressure line. This means that the low pressure control signals are isolated during this phase and counterbalance pressure is the only thing that operates the power flow element 10 as if it were a two-way valve acting between ports 122 and 118.

Logically the pump vent is still on since solenoid 78 is still energized and therefore the pump is capable of developing very high pressures automatically set by its own internal pressure controller during this phase of feed. The flow is dictated by the pump flow itself and is high volumetric flow such as regeneration would have caused.

Referring to FIG. 3, considering that solenoid 78 is still energized the pump vent signal flow is closed giving high pressures. Suppose then that the motor 130 is pushing a load such as a press for compressing plywood, plastic or the like using a slow motor speed and full pump pressure available at the bore chamber 132 through the power flow element 12 being open. Also the rod chamber 134 is controlled by the output pressure counterbalance. This is a normal type circuit often in the control of presses. Now, also it is necessary to be able to stop. Solenoid 76 is already de-energized and with signal flow element 72 in neutral, so it is only necessary to de-energize solenoid 78 of signal flow element 74 and the control pressures at chamber 52 would go to zero because signal flow element 74 would vent back to the reservoir and line 24 would go to zero pressure causing power flow element 12 to go to center position under the action of its springs.

The counter balance signal flow element 164 will close and there will be no more flow through power flow element 10 since it has returned to center position since there is no pressure drop across orifice 228 to the counterbalance pilot. All system components will be standing by but what we do observe is the pump vent as we de-energize solenoid 78 which opens signal flow element 74 which reduces signal flow pressure which is set, for example at 300 psi. This would be applied to the pump controller and the pump then would go back to low pressure set by reducing signal flow element 162 and pressure line 14 would be standing by at low pressure determined from the counterbalances of the return flow reducing element. Hence motor 130 is stopped with both the bore and the rod chambers blocked by power flow elements 10 and 12 in their centered positions and the pump is standing by at some lower pressure set by reducing signal flow element 162.

This is the normal state of eliminating power losses and high pressure standby surges and represents a reasonable unloaded state of the system.

Now the next step of operation is to reverse the motor and go back. In order to do this we know that if we energize solenoid 76 pressure is applied from line 14 to line 280 to pressurize rod chamber 134 of the motor and arrange for the bore chamber 132 to go directly to the reservoir.

Now then, with solenoid 76 energized pressurized fluid is present in the signal line 28 which is conveyed through the check valve 36 into signal line 32 and then into spring chamber 56. Such pressurizing fluid opposes spring 54 and moves the spool of power flow element 10 to the open position connecting line 14 to line 280 and the pressurized fluid of rod chamber 134.

Simultaneously pressurized fluid in signal line 28 is conveyed to power line 284 to counterbalance logic element 166 which closes spool 174 against bias spring 182 to close ports 210 and 212 which would normally have connected rod chamber 134 and line 280 to the spring chamber 54 and spring chamber 54 is automatically vented to reservoir 38 through port 210 and 208 of the counterbalance logic element 166.

Hence solenoid 76 actually logically shuts off the counterbalance bridge and vents the back side so that the pump delivers pressurized fluid to the rod chamber for reverse.

Now as the rod pressure is high enough in line 280 it could ordinarily open the counterbalance signal flow element 164 and create a pressure drop across orifice 220. But orifice 236 is a highly resistance orifice and the low pressure pilot flow cannot escape through 236, and hence still maintains low pressure pilot pressure on chamber 56 even though line 272 is connected to reservoir through the counterbalance pilot 164 with a very small pilot flow.

Now then, if the pressurized fluid is on rod chamber 134 by the action of the power flow element 10 we also see that line 28 is conducted through orifice 44 and 246 bridge to a one-half power flow at chamber 50 of power flow element 12. This means that the signal pressure in this bridge would oppose spring 52 and tend to move the power flow spool in a direction to connect line 20 to line 18 and henceforth to reservoir 138.

In order to do this the pilot line 24 would have to be closed to reservoir pressure. This occurs since line 264 is essentially connected to signal flow element 74 with solenoid 78 in its deenergized state being connected to reservoir. Hence we see spring chamber 52 is at reservoir pressure.

With power flow element 12 reversed it allows fluid from the chamber 132 to proceed to the reservoir 138. With adjustment 242 for power flow element 12 open the flow can be throttled to adjust the return speed of the motor. It is not pressure compensated but is simply a restriction which tends to give controlled speed without preciseness but it does represent another option with respect to operating the power flow elements.

Now as motor 130 is retracting there is a push-pull arrangement again with the power flow elements 10 indexed in a direction from pressure to solenoid and we have the power flow elements 12 indexed from solenoid to reservoir in a push-pull arrangement. It can also be mentioned that check valve 26 is in the picture to allow free flow for reverse application of power pressure whereas resistance 48 is to restrict the rate of movement of power flow element 12 in the direction of reversing the flow.

In constructing circuits in accordance with the present invention these check valves and orifices are used in series or parallel to accomplish different rate damping effects. The same thing is true of the counterbalance portion of the bridge servicing power flow element 10 when orifice 230 and check valve 232 are used. The check valve 231 for this rapid flow to line 276 upon restricted flow out of line 276 through orifice 233 functions to permit the elements to move fast in one direction, slow in an another, and does not represent any control function other than to rate the damping.

It should also be mentioned that on retraction, since solenoid 78 is de-energized the pump vent element 160 is open and the system is limited by reducing pressure on the pump pressure. In other words the pump pressure is controlled by line 260 to respond only to the pressure set by reducing element 162. In this particular case the reducing pressure would be all that was possible to apply to the rod chamber 134 during retract operation of the motor.

Many times this is essential to keep from going into the high pressure mode in certain portions of motor operation. When the solenoid does retract it can be left in this position and there would not be much power loss since the operation is high pressure at any time. This means that in the center or stop position of the motor it is at lower pressure and in the retract position of the motor it is at lower pressure, and only during the forward stroke of the motor do we permit high pressure to occur. This is all done by the pump vent logic cooperating with the reducing and dictated to by which solenoids are energized in the directional control sequence. In considering the entire system we have a motor controller represented by two power flow elements which are three position modulating valves themselves and they receive signals at the four control chambers which are sometimes directly operated by low pressure signals using check valves for isolation from high pressure systems. Sometimes the power flow elements are operated by a bridge effect which effects a balance where the pressure on both sides is a maximum till a sensor allows a pilot flow to occur across an orifice thereby inducing pressure drops or balance the bridge such that the power flow elements move in the direction of the pressure biasing.

Sometimes the system is operated with low pressure bridge biasing as indicated in the regeneration discussed where a fixed reduction of control pressure is applied to one side and full control pressure to the other to effect shift and the same bridge will apply adequate pressure since a side is at zero and these various techniques are all part of the programming control technique for using signal flow elements in a various organized modular arrangements because as we see from FIG. 4 the general packaging arrangement through all of the signal flow modules provides numerous four-duct passages through all of the modules with optional orifices or plug arrangements sometimes in series, sometimes in parallel, to select different paths to various ports and elements in series or parallel.

Sometimes the system utilizes outside lines to take a signal from one portion of the module assembly to another portion without going through the four-channel internal ducts. This would be obviously necessary because in some cases signals are generated at points we cannot take back through the elements.

But in all cases with signal flow logic the lines are always very small because very small flows and pressure drops are required to accomplish control of the power flow. So the essential approach is to use standard common orifices on the signal flow modules and spacer modules, with interfaces identical to the interfaces of signal flow valve modules.

Sometimes single valve modules and sometimes dual valve modules are used which work out to be the optimum packaging groupings.

When a system requirement goes beyond two modules, it becomes practical to assemble dual modules and single modules onto a signal block in a prescribed pattern. For instance signal block 217 has three faces, whereas signal block 126 is simply a spacer with a couple of control options inside and it only has two faces. But with signal block 217 it is possible to mount on three faces in any manner desired. In fact we can mount signal block 217 on its side and when it becomes mounted on itself it packs up two more control surfaces that would not normally have been the case if only the one signal face were used for mounting the control modules.

It will now be seen that one can build up various systems in an escalating way such that each face can indeed accept a dual module or a single module. So looking at signal block 217 three single valve module envelopes can be put on or three dual module elements if required. So it could be three or six signal valve modules directly mounted on signal block 217.

If signal block 217 is mounted on itself in the particular manner to pick up two more dual valve modules and if this is done on all three faces the system would comprise four signal valve modules on each face to provide 12 signal valve modules on one primary signal block 217.

Signal blocks 126, the thin blocks, are used as spacer blocks not only to accomplish control functions but merely to space out to get physical clearance between the other modules and between the two signal blocks. Hence it is possible to build up an infinite number of different control options.

In general, the present modular system is arranged to keep the required signal block modules down to a minimum. Also the blocks are grouped generically such that power flow modules directly would mount signal blocks, and signal modules that directly effect the pump and motor controllers would generally use logic, sensor, and switching elements.

In some cases the signal flow modules effect each other such as the pump vent. This could have been mounted on the pump control directly which is an option, or it could be packaged in with the motor controller as has been done in the FIG. 3 system.

In all of the various systems there are decisions to make as to which modules are most likely or efficiently packaged with any particular controller. But the fundamental theme of the present invention is to use standard parts and standard signal flow valve modules with standard interfaces, orifices, and springs.

In the case of the system described, two three-way power flow elements are utilized to act as a four-way valve with both directional and modulating capabilities. In effect, the signal flow elements 10 and 12 act like a two-way valve when they are taking over the counterbalance function and in a sense are acting as three-ways individually and in a total act as a four-way valve to control the flow to and from the motor controller.

Hence the systems described are examples of two-way, three-way, and four-way valve action all in one modular package. The elements are operated both with low pressure signal flow and also directly with high pressure bridge bleed offs in the sense of the counterbalance when it was directed to the high pressure bridge as well as low pressure bridges and low pressure signals.

The system further provides low pressure signal operation at times and when high pressure comes in, check valves close to isolate the low pressure from the high pressure but in no way interferring with either operation.

Also, the systems incorporate mechanical adjustments that operate directly on the power flow spool as indicated by adjustment 242 without effecting the pilot signals applied to them to limit the action of the power flow elements or overruling them as regards to the signal flow. An example would be to impose a signal flow on a motor controller which tells it to open up completely but the mechanical adjustment could overrule and allow only an adjustable partial movement even though full low pressure signals are present. Also solenoids can be replaced with other types of actuators such as cams or they can be energized from various selected functions.

As another aspect of the present invention, the particular programming of the various signal flow modules is determined by the lands on a single novel spool. There are optional lands on the spool that can be selectively positioned to pick up the signal flow ports to act as three-ways, two-ways or do whatever sequence of control logic that is necessary. There is no need to change any of the other modules. As was previously described the power flow modules and spool elements never change and are essentially a three-way with closed center which can take over the role of any three-way valve such as modulating and switching functions. The signal flow elements are essentially a standard spool and seat arrangement where the spool ends are programmable by crush grinding the particular land we are interested in and we obtain the advantage that one port can open before another port closes or one port can close before another opens, and three-way action can be effected such that one port closes off the first port before it opens to a second port. Examples of these signal flow spool arrangements are shown in typical control systems disclosed herein.

I claim:

1. A universal directional valve programmable for all valving functions, said apparatus comprising, in combination, a power flow module for controlling the power flow from a pump to a fluid motor, said module comprising two identical independently controllable power flow elements, each of said power flow elements being shiftable between "neutral", "forward", and "reverse" positions by pressure signals from two signal flow ports; power flow ports in said power flow module for connection with said pump, fluid motor, and a reservoir; a standard power flow module interface on said power flow module and including standardized signal flow porting communicating with said signal flow ports; and an infinitely programmable modular signal flow valve system including a standard signal flow module interface mounted on said power flow module interface and including standardized signal flow porting that registers with said signal flow porting of said power flow module interface, and said signal flow valve system including standard selectively programmable modules provided with a common standard interface, port and duct configuration, standard selectively programmable valve spool configuration, and associated control elements, said signal flow valve system serving to control signal flows of fluid through said signal flow porting and to and from said control ports to effect control of said power flow elements.

2. A universal directional valve programmable for all valving functions, said apparatus comprising, in combination, a power flow module for controlling the power flow from a pump to a fluid motor, said module comprising two identical independently controllable power flow elements, each of said power flow elements being shiftable between neutral, forward, and reverse positions by pressure signals from two signal flow ports; power flow ports in said power flow module for connection with said pump, fluid motor, and a reservoir; a standard power flow module interface on said power flow module and including standardized signal flow porting communicating with said signal flow ports; an infinitely programmable modular signal flow valve system comprising a standard signal flow switching module including two standard selectively programmable signal flow elements, each of said signal flow elements being independently shiftable between neutral, forward, and reverse positions to effect control of said power flow elements; and a standard signal flow module interface conforming with said power flow module interface and including standard signal flow porting that registers with said signal flow porting of said power flow module interface so as to conduct signal flows of pressurized fluid between said modules and thereby directionally control the power flows between the pump and fluid motor.

3. A universal directional valve programmable for all valving functions, said apparatus comprising, in combination, a power flow module; a first power flow spool bore in said module and including a first forward signal flow port at one end of said first spool bore, a first reverse signal flow port at the other end of said first spool bore, a first pump connecting port, a first reservoir connecting port, and a first motor connecting port; a second power flow spool bore in said module and including a second forward signal flow port at one end of said second spool bore, a second reverse signal flow port at the other end of said spool bore, a second pump connecting port, a second reservoir connecting port, and a second motor connecting port; a first independently controllable power flow spool element in said first spool bore; a second independently controllable power flow spool element in said second spool bore; a standard power flow module interface on said power flow module and including standardized signal flow porting communicating with said signal flow ports of said spool bores; an infinitely programmable modular signal flow valve system comprising a standard signal flow module including a standard signal flow module interface mounted on said power flow module interface and including standardized signal flow porting that registers with said signal flow porting of said power flow module interface, and said signal flow valve system including standard selectively programmable modules provided with a common standard interface, port and duct configuration, standard selectively programmable valve spool configuration, and associated control elements, said signal flow valve system serving to control signal flows of fluid through said signal flow porting and to and from said control ports to effect control of said power flow elements.

4. The directional valve apparatus of claim 3 wherein said power flow module comprises check valves and orifices located in parallel flow relationship in the control flows from said signal flow module to said control ports.

5. The directional valve apparatus of claim 3 wherein said signal flow control means includes a first shiftable signal flow spool for controlling the signal flow to and from said first and second forward signal flow ports; and a second shiftable signal flow spool for controlling the signal flow to and from said first and second reverse signal flow ports.

6. The directional valve apparatus of claim 3 wherein said power flow module comprises check valves and orifices located in parallel flow relationship in the control flows from said signal flow module to said control ports and wherein said signal flow control means includes a first shiftable signal flow spool for controlling the signal flow to and from said first and second forward signal flow ports; and a second shiftable signal flow spool for controlling the signal flow to and from said first and second reverse signal flow ports.

7. A universal directional valve programmable for all valving functions, said apparatus comprising, in combination, a power flow module for controlling the power flow from a pump to a fluid motor, said module comprising two identical independently controllable power flow elements, each of said power flow elements being shiftable between neutral, forward, and reverse positions by pressure signals from two signal flow ports; a standard power flow module interface on said power flow module and including standardized signal flow porting communicating with said signal flow ports; a signal flow center block module including a first standard center block interface and standardized porting that register with said power flow interface and standardized porting of said power flow module, a second standard center block interface and standardized porting, and a third standard center block interface and standardized porting; an infinitely programmable modular signal flow valve system comprising a standard signal flow switching module including a standard switching module interface and standardized porting that register with said second standard center block interface and standardized porting of said center block module, said signal flow switching module serving to control signal flows of fluid through said signal flow porting to and from said control ports; a second standard signal flow switching module including a second standard switching module interface and standardized porting that register with said third standard center block interface and standardized porting of said center block module, said second signal flow switching module serving to modify the effect of said signal flow on said power flow module, each of said signal flow switching modules including standard module bodies with standard ducts, standard porting, and selectively programmable signal flow control spools of standard configuration.

8. The directional valve apparatus of claim 7 wherein said second standard signal flow switching module includes a flow reducing signal flow element for controlling the pressure of the power flow between said power flow module and said motor.

9. The directional valve apparatus of claim 7 wherein said second standard signal flow switching module includes a pump vent signal flow element for controlling the venting of the power flow delivered by the pump.

10. The directional valve apparatus of claim 7 wherein said second standard signal flow switching module includes a flow reducing signal flow element for controlling the pressure of the power flow between said power flow module and said motor; and a pump vent signal flow element for controlling the venting of the power flow delivered by the pump.

11. The directional valve apparatus of claim 7 wherein said second standard signal flow switching module includes a counterbalance signal flow element for modifying the signal flow effect on said power flow elements.

12. The directional valve apparatus of claim 7 wherein said second standard signal flow switching module includes a first signal flow element for modifying the signal flow effect on said power flow elements; and a logic signal flow element for modifying the operation of said first signal flow element.

13. The directional valve apparatus of claim 7 wherein said second standard signal flow switching module includes a counterbalance signal flow element for modifying the signal flow effect on said power flow elements; and a logic signal flow element for modifying the operation of said counterbalance signal flow element.

14. The directional valve apparatus of claim 1 wherein said signal flow module includes four standard signal flow ducts communicating with said standardized porting.

15. The directional valve apparatus of claim 2 wherein said signal flow module includes four standard signal flow ducts communicating with said standardized porting.

16. The directional valve apparatus of claim 3 wherein said signal flow module includes four standard signal flow ducts communicating with said standardized porting.

17. The directional valve apparatus of claim 7 wherein said signal flow modules include four standard signal flow ducts communicating with said standardized porting.

18. A universal directional valve programmable for all valving functions, said apparatus comprising, in combination, a power flow module for controlling the power flow from a pump to a fluid motor, said module comprising a power flow element shiftable between neutral, forward, and reverse positions by pressure signals from two signal flow ports; a standard power flow module interface on said power flow module and including standardized signal flow porting communicating with said signal flow ports; an infinitely programmable modular signal flow valve system comprising a standard signal flow center block module including a first standard center block interface and standardized porting that register with said power flow interface and standardized porting of said power flow module, a second standard center block interface and standardized porting, and a third standard center block interface and standardized porting; a first standard signal flow switching module including a standard switching module interface and standardized porting that register with said second standard center block interface and standardized porting of said center block module, said signal flow switching module serving to control signal flows of fluid through said signal flow porting to and from said control ports; a second standard signal flow switching module including a second standard switching module interface and standardized porting that register with said third standard center block interface and standardized porting of said center block module, said second signal flow switching module serving to modify the effect of said signal flow on said power flow module, each of said signal flow modules including standard module bodies with standard interfaces and ports that register with one another in various programmable arrays, said switching modules including signal flow control spools of standard spool configuration.

19. The directional valve apparatus of claim 18 wherein said signal flow modules include four standard signal flow ducts communicating with said standardized porting.

20. The directional valve apparatus of claim 18 wherein said second standard signal flow switching module includes a flow reducing signal flow element for controlling the pressure of the power flow between said power flow module and said motor.

21. The directional valve apparatus of claim 18 wherein said second standard signal flow switching module includes a pump vent signal flow element for controlling the venting of the power flow delivered by the pump.

22. The directional valve apparatus of claim 18 wherein said second standard signal flow switching module includes a flow reducing signal flow element for controlling the pressure of the power flow between said power flow module and said motor; and a pump vent signal flow element for controlling the venting of the power flow delivered by the pump.

23. The directional valve apparatus of claim 18 wherein said second standard signal flow switching module includes a counterbalance signal flow element for modifying the signal flow effect on said power flow elements.

24. The directional valve apparatus of claim 18 wherein said second standard signal flow switching module includes a first signal flow element for modifying the signal flow effect on said power flow elements; and a logic signal flow element for modifying the operation of said first signal flow element.

25. The directional valve apparatus of claim 18 wherein said second standard signal flow switching module includes a counterbalance signal flow element for modifying the signal flow effect on said power flow elements; and a logic signal flow element for modifying the operation of said counterbalance signal flow element.

* * * * *